United States Patent
Ohashi

(10) Patent No.: US 10,921,934 B2
(45) Date of Patent: Feb. 16, 2021

(54) INFORMATION PROCESSING APPARATUS, INFORMATION PROCESSING METHOD, AND RECORDING MEDIUM

(71) Applicant: SONY CORPORATION, Tokyo (JP)

(72) Inventor: Takeshi Ohashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/621,083

(22) PCT Filed: Mar. 23, 2018

(86) PCT No.: PCT/JP2018/011773
§ 371 (c)(1),
(2) Date: Dec. 10, 2019

(87) PCT Pub. No.: WO2018/235371
PCT Pub. Date: Dec. 27, 2018

(65) Prior Publication Data
US 2020/0218423 A1    Jul. 9, 2020

(30) Foreign Application Priority Data

Jun. 20, 2017 (JP) .............................. JP2017-120502

(51) Int. Cl.
| | |
|---|---|
| G09G 5/00 | (2006.01) |
| G06F 3/041 | (2006.01) |
| G06F 3/01 | (2006.01) |
| G06F 3/0488 | (2013.01) |

(52) U.S. Cl.
CPC .......... *G06F 3/04186* (2019.05); *G06F 3/013* (2013.01); *G06F 3/0488* (2013.01); *G06F 2203/04106* (2013.01)

(58) Field of Classification Search
CPC ........ G06F 3/017; G06F 3/011; G06F 3/0418; G06F 3/0488; G06F 2203/04106; G06F 3/013; H04N 7/188; G06K 9/00604; G02B 27/0172; G02B 27/0093
USPC ....................................................... 345/8, 156
See application file for complete search history.

(56) References Cited

U.S. PATENT DOCUMENTS

| | | | |
|---|---|---|---|
| 10,564,770 B1 * | 2/2020 | Keeler ................ | G06F 3/0418 |
| 2009/0110235 A1 * | 4/2009 | Marti ..................... | G06F 3/043 |
| | | | 382/103 |
| 2016/0041624 A1 * | 2/2016 | Spiessl ................. | H04N 7/188 |
| | | | 345/8 |

FOREIGN PATENT DOCUMENTS

| | | |
|---|---|---|
| JP | 2012-008808 A | 1/2012 |
| JP | 2013-250882 A | 12/2013 |
| JP | 2014-179072 A | 9/2014 |
| JP | 2014-228945 A | 12/2014 |

\* cited by examiner

*Primary Examiner* — Jennifer T Nguyen
(74) *Attorney, Agent, or Firm* — Paratus Law Group, PLLC

(57) ABSTRACT

There is provided an information processing apparatus to increase the manipulability during manipulation of a device by means of an instruction using a part of the body of a user, the information processing apparatus including: a detection unit that executes detection of a one-eye-closed state in which one eye of a user is opened and another eye is closed; and a control unit that identifies an instruction position instructed by a part of a body of the user depending on a result of detection of the one-eye-closed state by the detection unit.

15 Claims, 17 Drawing Sheets

ONE-EYE-CLOSED STATE
(STATE IN WHICH ONLY RIGHT EYE IS OPEN)

ONE-EYE-CLOSED STATE
(STATE IN WHICH ONLY LEFT EYE IS OPEN)

FIG. 4
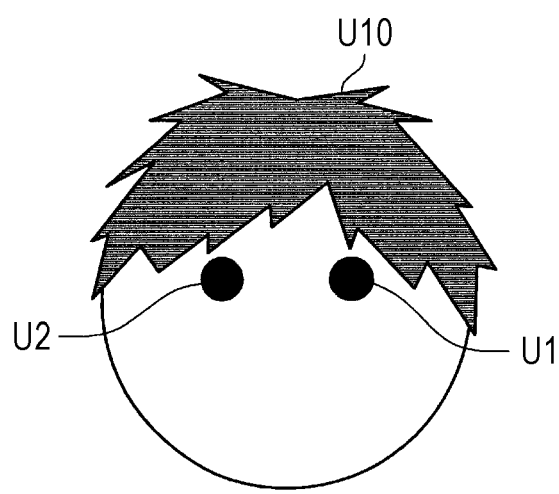
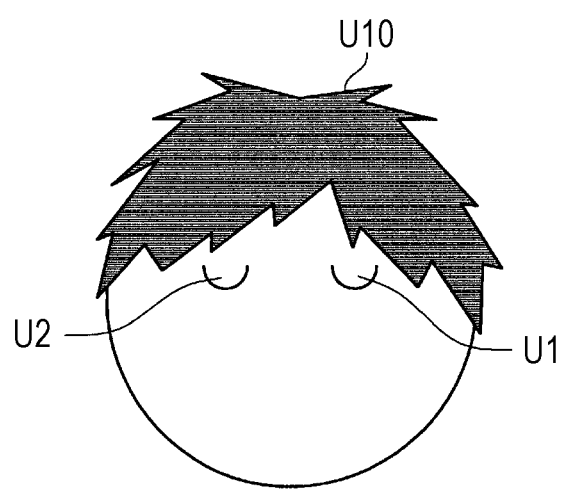
BOTH-EYES-OPENED STATE         BOTH-EYES-CLOSED STATE

INFORMATION PROCESSING APPARATUS, INFORMATION PROCESSING METHOD, AND RECORDING MEDIUM

CROSS REFERENCE TO PRIOR APPLICATION

This application is a National Stage Patent Application of PCT International Patent Application No. PCT/JP2018/011773 (filed on Mar. 23, 2018) under 35 U.S.C. § 371, which claims priority to Japanese Patent Application No. 2017-120502 (filed on Jun. 20, 2017), which are all hereby incorporated by reference in their entirety.

TECHNICAL FIELD

The present disclosure relates to an information processing apparatus, an information processing method, and a recording medium.

BACKGROUND ART

In recent years, as a user interface for achieving intuitive manipulation of various devices, there has been propose user interfaces enabling a user to manipulate a device by means of an instruction using a part of the body of the user.

For example, Patent Document 1 discloses a technology in which a position on a straight line connecting the position of an eye of a user and the position of a finger is identified as an instruction position instructed by a part of the body of a user, and manipulation, e.g., reproduction of content, depending on the instruction position is accepted.

CITATION LIST

Patent Document

Patent Document 1: Japanese Patent Application Laid-Open No. 2013-250982

SUMMARY OF THE INVENTION

Problems to be Solved by the Invention

Incidentally, in the field related to a user interface that enables a user to manipulate a device by means of an instruction using a part of the body of a user, it is considered to be desirable that manipulability is increased. For example, with the technology of Patent Document 1, even in a case where the user unconsciously moves a hand without intention of manipulation, there is a possibility that the manipulation not intended by the user, e.g., reproduction of content depending on the instruction position, is executed in response to the movement of the hand.

Thus, the present disclosure proposes novel and improved information processing apparatus, information processing method, and recording medium capable of increasing manipulability for manipulation of a device by means of an instruction using a part of the body of a user.

Solutions to Problems

According to the present disclosure, there is provided an information processing apparatus including: a detection unit that executes detection of a one-eye-closed state in which one eye of a user is opened and another eye is closed; and a control unit that identifies an instruction position instructed by a part of a body of the user depending on a result of detection of the one-eye-closed state by the detection unit.

Furthermore, according to the present disclosure, there is provided an information processing method including: executing, by an information processing apparatus, detection of a one-eye-closed state in which one eye of a user is opened and another eye is closed; and identifying an instruction position instructed by a part of a body of the user depending on a result of detection of the one-eye-closed state by the information processing apparatus.

Furthermore, according the present disclosure, there is provided a computer-readable recording medium recording a program for causing a computer to function as: a detection unit that executes detection of a one-eye-closed state in which one eye of a user is opened and another eye is closed; and a control unit that identifies an instruction position instructed by a part of a body of the user depending on a result of detection of the one-eye-closed state by the detection unit.

Effects of the Invention

As described above, according to the present disclosure, it is possible to increase the manipulability for manipulation of a device by means of an instruction using a part of the body of the user.

Note that the effects described above are not necessarily limitative. With or in place of the above effects, there may be achieved any one of the effects described in this specification or other effects that may be grasped from this specification.

BRIEF DESCRIPTION OF DRAWINGS

FIG. 4 is an explanatory view illustrating an example of a status of a face in a both-eyes-opened state and a both-eyes-closed state.

MODE FOR CARRYING OUT THE INVENTION

Figure 1:
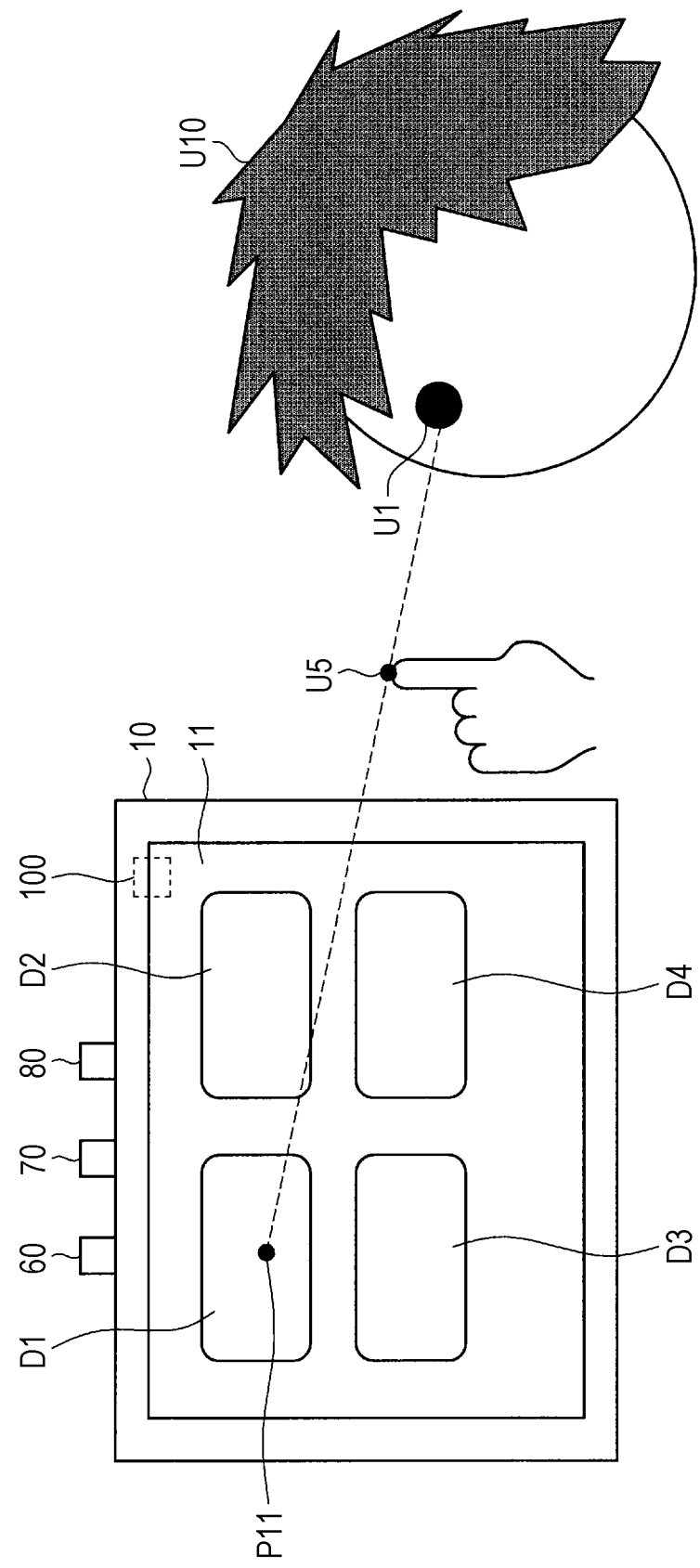
FIG. 1 is a schematic view illustrating an example of a schematic configuration of a display system according to an embodiment of the present disclosure.

Preferred embodiments of the present disclosure will be described in detail below with reference to the accompanying drawings. Note that, in this description and the drawings, configuration elements that have substantially the same function and configuration are denoted with the same reference numerals, and repeated explanation is omitted.

Note that the description is given in the order below.
1. Configuration of display system
2. Operation of information processing apparatus
3. Effect of information processing apparatus
4. Variations
4-1. First variation
4-2. Second variation
5. Conclusion 1. Configuration of Display System First, a configuration of a display system 1 according to an embodiment of the present disclosure is described with reference to FIGS. 1 to 4.

FIG. 1 is a schematic view illustrating an example of a schematic configuration of the display system 1 according to the present embodiment.

The display system 1 is a system that provides a user interface for achieving intuitive manipulation of a display apparatus 10 used in a state of being installed on a base, a wall, or the like.

The display system 1 includes, as illustrated, for example, in FIG. 1, a display apparatus 10, an eye opening/closing detection camera 60, an eye position detection camera 70, a finger position detection camera 80, an information processing apparatus 100.

The display apparatus 10 is an apparatus that is used in a state of being installed on a base, a wall, or the like, and displays various images. Note that an image displayed by the display apparatus 10 can include a moving image in addition to a still image. The display apparatus 10 specifically includes a screen 11 having a planar shape on which an image is displayed. For example, FIG. 1 illustrates an example in which objects D1 to D4 are displayed on the screen 11. Thus, the screen 11 corresponds to a region where the object is arranged. Note that the objects D1 to D4 may be, for example, a widget, e.g., a button, or may be a character, an icon or the like of a game image.

In the display system 1, a user U10 can manipulate the display apparatus 10 by means of an instruction using a part of the body of the user U10. For example, the user U10 can select any one of the objects D1 to D4 by means of an instruction using an eye, a fingertip, or the like to perform manipulation corresponding to each object Note that FIG. 1 illustrates, as an example, a status in which the object D1 is selected by an instruction using a left eye U1 and a left-hand fingertip U5 of the user U10. Details of the instruction using a part of the body of the user U10 will be described later.

The eye opening/closing detection camera 60 acquires, by means of imaging, an image used for detection of an opening/closing state of an eye of the user U10. Specifically, the eye opening/closing detection camera 60 acquires, by means of imaging, a two-dimensional image showing both eyes of the user U10 as an image used for detection of an eye opening/closing state. The eye opening/closing detection camera 60 is provided, for example, at an upper part of the display apparatus 10.

The eye position detection camera 70 acquires, by means of imaging, an image used for detection of the position of an eye of the user U10. Specifically, the eye position detection camera 70 acquires, by means of imaging, a depth image showing both eyes of the user U10 as an image used for detection of the position of an eye. The depth image is an image having information indicating depth of a subject. For example, as the eye position detection camera 70, a stereo camera or a time of flight (TOF) camera can be used. The eye position detection camera 70 is provided, for example, at an upper part of the display apparatus 10.

The finger position detection camera 80 acquires, by means of imaging, an image used for detection of the position related to a finger of the user U10. Specifically, the eye position detection camera 70 acquires, by means of imaging, a depth image showing a finger of the user U10 as an image used for detection of the position related to a finger. For example, as the finger position detection camera 80, a stereo camera or a TOF camera can be used. The finger position detection camera 80 is provided, for example, at an upper part of the display apparatus 10.

The information processing apparatus 100 includes a central processing unit (CPU), which is an arithmetic processing apparatus, a read only memory (ROM), which is a storage element that stores a program, an arithmetic parameter, or the like used by the CPU, a random access memory (RAM), which is a storage element that temporarily stores a parameter or the like that is properly changed by execution of the CPU, and the like. The information processing apparatus 100 is incorporated, for example, in the display apparatus 10.

Figure 2:
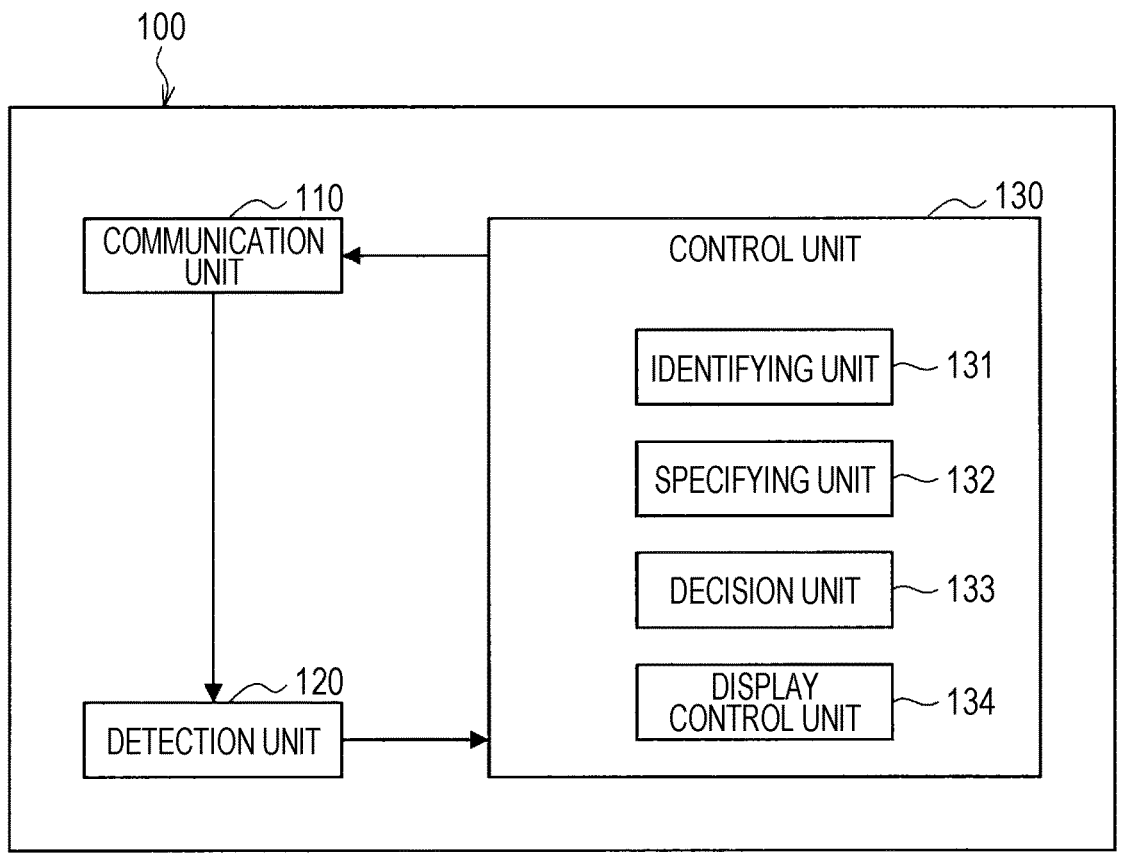
FIG. 2 is a block diagram illustrating an example of a functional configuration of an information processing apparatus of the embodiment.

FIG. 2 is a block diagram illustrating an example of a functional configuration of the information processing apparatus 100 according to the present embodiment.

The information processing apparatus 100 includes, for example, as illustrated in FIG. 2, a communication unit 110, a detection unit 120, and a control unit 130.

The communication unit 110 communicates with an apparatus external to the information processing apparatus 100 by wire or via a wireless information network.

Specifically, the communication unit 110 receives images acquired by the cameras: the eye opening/closing detection camera 60, the eye position detection camera 70, and the finger position detection camera 80, and outputs the images to the detection unit 120. Furthermore, the communication unit 110 transmits an operation command for controlling an operation of the display apparatus 10, which is output from the control unit 130, to the display apparatus 10.

The detection unit 120 executes various detection processing on the basis of the images acquired by the cameras, and outputs a detection result to the control unit 130.

Specifically, the detection unit 120 detects an opening/closing state of an eye of the user U10 on the basis of a two-dimensional image acquired by the eye opening/closing detection camera 60 and showing both eyes of the user U10.

The detection unit 120 can use, for example, a statistical model learnt according to an algorithm such as boosting to detect an eye opening/closing state on the basis of a feature amount of the two-dimensional image acquired by the eye opening/closing detection camera 60. In the processing of detecting the eye opening/closing state using a statistical model, specifically, the detection unit 120 extracts a region showing the face of the user U10 on the two-dimensional image acquired by the eye opening/closing detection camera 60, next extracts a region showing the left eye U1 and a right eye U2 in the region showing the face, and next detects the opening/closing state of the left eye U1 and the right eye U2. Note that, in the processing of detecting the eye opening/closing state using a statistical model, for example, an interpixel difference feature, which is a difference between brightness values of any two pixels of the image, can be used as a feature amount. Furthermore, the statistical model used in the processing of detecting the eye opening/closing state can be stored, for example, in a storage element of the information processing apparatus 100.

Figure 3:
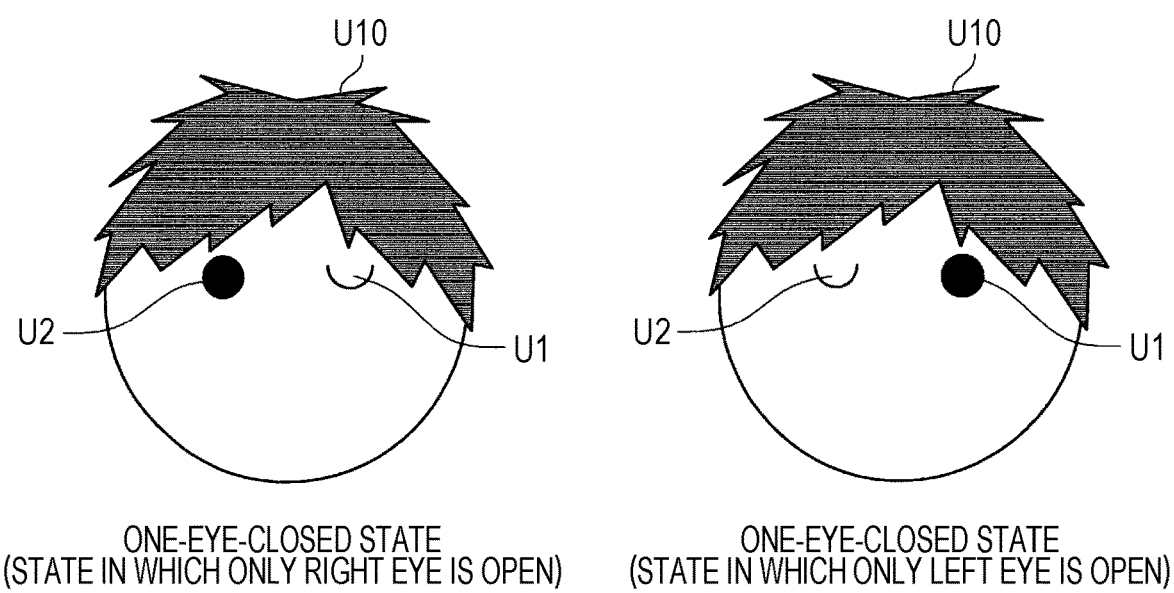
FIG. 3 is an explanatory view illustrating an example of a status of a face in a one-eye-closed state.

FIG. 3 is an explanatory view illustrating an example of a status of a face in a one-eye-closed state. For example, the detection unit 120, as illustrated in FIG. 3, detects a state in which the left eye U1 of the user U10 is closed and the right eye U2 is opened or a state in which the left eye U1 of the user U10 is opened and the right eye U2 is closed as the one-eye-closed state. Thus, the one-eye-closed state is a state in which one eye of the user U10 is opened and the other eye is closed.

FIG. 4 is an explanatory view illustrating an example of a status of faces in the both-eyes-opened state and the both-eyes-closed state. For example, the detection unit 120, as illustrated in FIG. 4, detects a state in which both eyes of the user U10 are opened as the both-eyes-opened state. Meanwhile, the detection unit 120 detects the state in which both eyes of the user U10 are closed as the both-eyes-closed state.

Furthermore, the detection unit 120 detects the position of an eye of the user U10 on the basis of a depth image acquired by the eye position detection camera 70 and showing both eyes of the user 1310.

The detection unit 120 can detect the position of an eye, for example, on the basis of information indicating depth of a region on the depth image corresponding to a region showing the left eye U1 and the right eye U2 on the two-dimensional image acquired by the eye opening/closing detection camera 60. In the eye position detection processing, specifically, the positions of the left eye U1 and the right eye U2 of the user U10 can be detected.

Note that the detection unit 120 may use, for example, a statistical model learnt according to an algorithm such as boosting to detect the position of an eye on the basis of a feature amount of the depth image acquired by the eye position detection camera 70. In the eye position detection processing using a statistical model, specifically, the detection unit 120 extracts a region showing the left eye 01 and the right eye U2 on the depth image acquired by the eye position detection camera 70 and then detects the positions of the left eye U1 and the right eye U2. Note that, in the eye position detection processing using a statistical model, for example, an interpixel difference feature can be used as the feature amount. Furthermore, the statistical model used in the eye position detection processing can be stored, for example, in the storage element of the information processing apparatus 100.

Furthermore, the detection unit 120 detects the position related to a finger of the user U10 on the basis of a depth image acquired by the finger position detection camera 80 and showing a finger of the user U10.

The detection unit 120 can use, for example, a statistical model learnt according to an algorithm such as boosting to detect the position related to a finger on the basis of the feature amount of the depth image acquired by the finger position detection camera 80. In the finger-related position detection processing using a statistical model, specifically, the detection unit 120 extracts a region showing fingertip U5 of user U10 on the depth image acquired by the finger position detection camera 80 and then detects the position of the fingertip U5 as the position related to a finger. Note that, in the finger-related position detection processing using a statistical model, for example, an interpixel difference feature can be used as the feature amount. Furthermore, the statistical model used in the finger-related position detection processing can be stored, for example, in the storage element of the information processing apparatus 100. Furthermore, the detection unit 120 may detect the position of another portion different from fingertip U5 of the finger of the user U10 as the position related to a finger.

The control unit 130 uses a detection result of the detection unit 120 to execute processing for achieving manipulation of the display apparatus 10 by means of an instruction using a part of the body of the user U10. The control unit 130 includes, for example, an identifying unit 131, a specifying unit 132, a decision unit 133, and a display control unit 134.

The identifying unit 131 identifies an instruction position instructed by a part of the body of the user U10 depending on results of one-eye-closed state detection by the detection unit 120.

The specifying unit 132 specifies a selection object candidate, which is a candidate of an object selected by the user U10, on the basis of an instruction position.

The decision unit 133, in a case where a decision movement by a part of the body of the user U10 is detected, decides the selection object candidate as a selection object, which is an object selected by the user U10.

The display control unit 134 controls the operation of the display apparatus 10 by outputting an operation command for controlling the operation of the display apparatus 10 to the communication unit 110.

2. Operation of Information Processing Apparatus

Next, an operation of the information processing apparatus 100 according to the present embodiment is described with reference to FIGS. 5 to 12.

Figure 5:
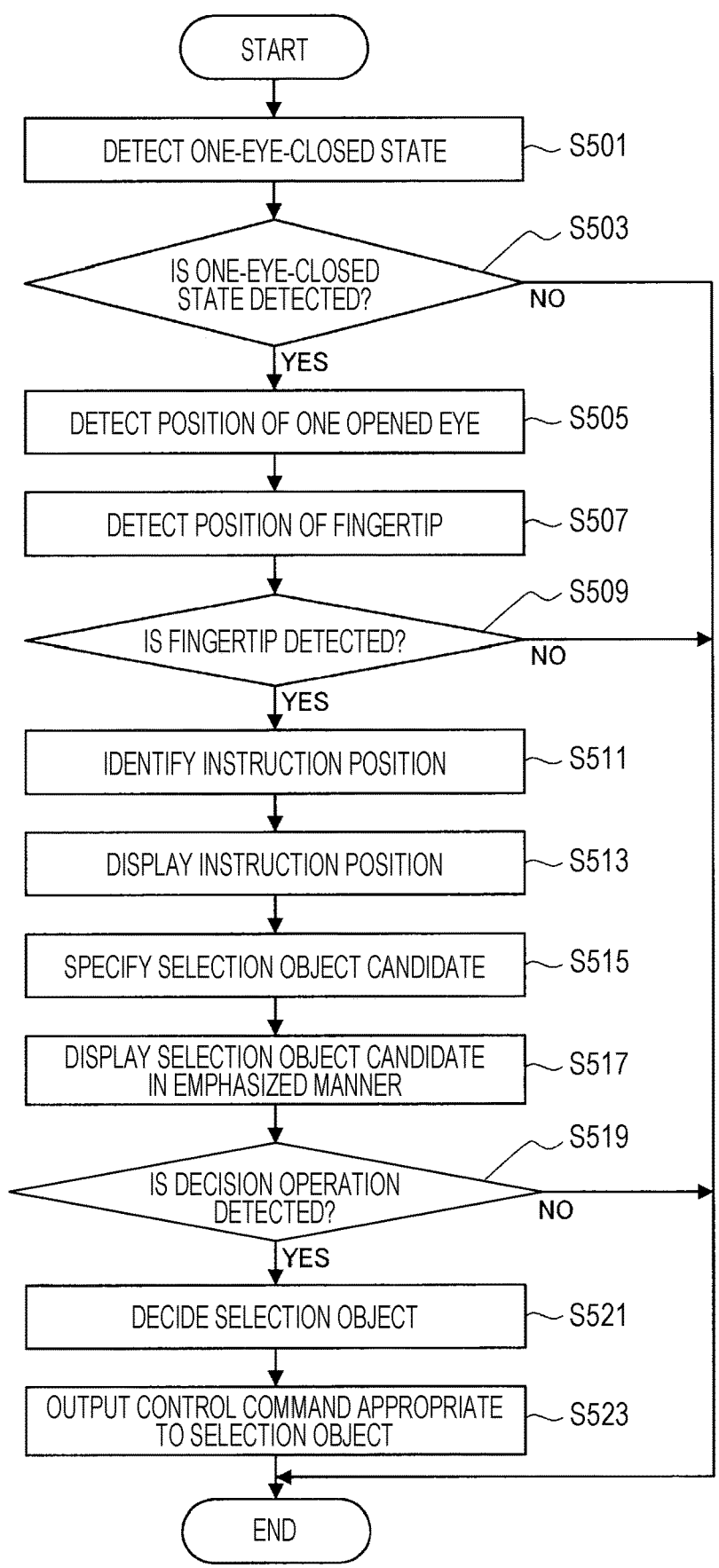
FIG. 5 is a flowchart illustrating an example of a flow of processing performed by an information processing apparatus according to the embodiment.

FIG. 5 is a flowchart illustrating an example of a flow of processing performed by the information processing apparatus 100 according to the present embodiment. For example, a processing flow illustrated in FIG. 5 is always repeated.

When the processing flow illustrated in FIG. 5 starts, first, in step S501, the detection unit 120 executes detection of the one-eye-closed state in which one eye of the user U10 is opened and the other eye is closed.

Specifically, the detection unit 120 can detect the opening/closing state of the left eye U1 and the right eye U2 of the user U10 and execute detection of the one-eye-closed state.

Next, in step S503, the Identifying unit 131 determines whether or not the one-eye-closed state has been detected. In a case where it is determined that the one-eye-closed state is detected (step S503/YES), the step proceeds to step S505. Meanwhile, in a case where it is not determined that the one-eye-closed state is detected (step S503/NO), the processing flow illustrated in FIG. 5 ends.

In step S505, the detection unit 120 detects the position of one opened eye of the user U10.

In step S507, the detection unit 120 detects the position of the fingertip U5 of the user U10.

In step S509, the identifying unit 131 determines whether or not fingertip U5 of the user U10 has been detected. In a case where it is determined that fingertip U5 has been detected (step S509/YES), the step proceeds to step S511. Meanwhile, in a case where it is not determined that fingertip U5 is detected (step S509/NO), the processing flow illustrated in FIG. 5 ends.

For example, the identifying unit 131 can determine whether or not fingertip U5 has been detected depending on whether or not a region showing fingertip U5 has been extracted on the depth image acquired by the finger position detection camera 80 in a process of the detection processing for the position of the fingertip U5 by the detection unit 120.

In step S511, the identifying unit 131 identifies an instruction position instructed by a part of the body of the user U10.

For example, the identifying unit 131 identifies the position on a straight line connecting the one opened eye and the fingertip U5 as an instruction position.

Specifically, FIG. 1 illustrates intersection P11 between a straight line connecting the left eye U1 corresponding to the one opened eye and the fingertip U5 and a screen 11, which is a region in which the object is arranged. In this case, the identifying unit 131 identifies, for example, the intersection P11 as an instruction position.

Note that FIG. 1 illustrates an example in which the left-hand fingertip U5 is used to specify an instruction position, but a right-hand fingertip may be used to specify an instruction position. For example, in a case where a right-hand fingertip of the user U10 has been detected, the identifying unit 131 may identify the intersection between the straight line connecting the left eye U1 corresponding to the one opened eye and a right-hand fingertip and the screen 11 as an instruction position.

Figure 6:
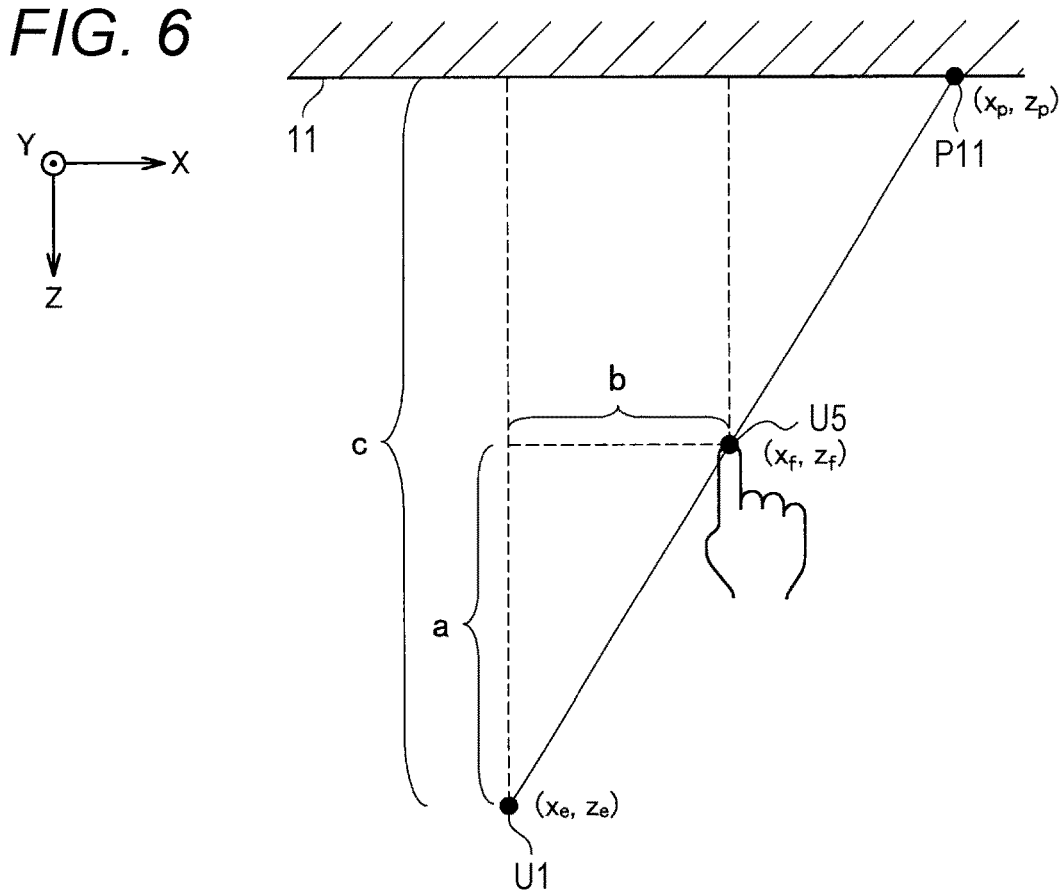
FIG. 6 is a top view illustrating an example of a positional relationship between a left eye, a fingertip, and a screen.
Figure 7:
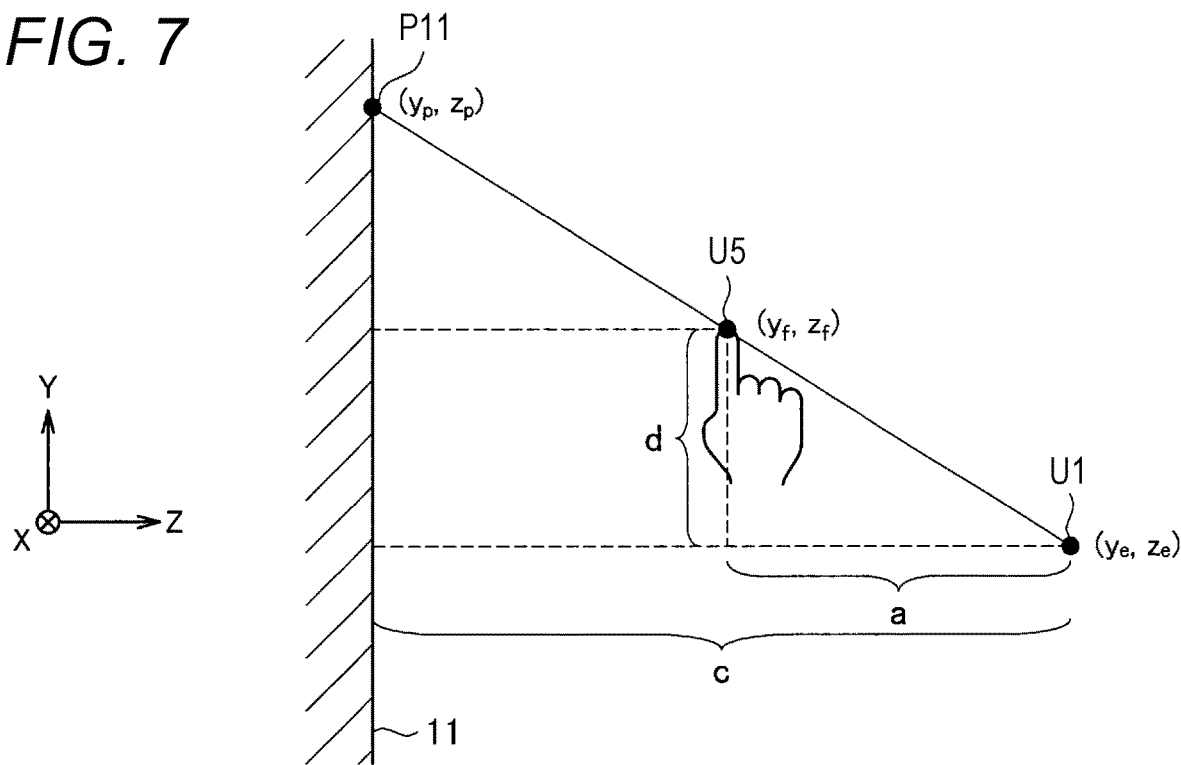
FIG. 7 is a side view illustrating an example of a positional relationship between a left eye, a fingertip, and a screen.

Here, with reference to FIGS. 6 and 7, a description is given of specific processing of identifying a specification position in a case where the eye opening/closing state of the user U10 is the one-eye-closed state in which only the left eye U1 is opened.

FIG. 6 is a top view illustrating an example of a positional relationship between the left eye U1, fingertip U5, and the screen 11. FIG. 7 is a side view illustrating an example of a positional relationship between the left eye U1, the fingertip U5, and the screen 11. In FIGS. 6 and 7, in a case where the screen 11 extends in a vertical direction, the positional relationship between the left eye U1, the fingertip U5, and the screen 11 is indicated such that the vertical direction is y direction, a direction perpendicular to the screen 11 is z direction, a direction perpendicular to y direction and z direction is x direction.

For example, the identifying unit 131 can acquire xz coordinate $(x_e, z_e)$ of the left eye U1 on the basis of the position of the left eye U1 detected by the detection unit 120. Furthermore, the identifying unit 131, on the basis of the position of the fingertip U5 detected by the detection unit 120, can acquire xz coordinate $(x_f, z_f)$ of fingertip U5. Furthermore, z coordinate on the surface of the screen 11 corresponding to z coordinate $(z_p)$ of the intersection P11 can be preliminarily stored, for example, in the storage element of the information processing apparatus 100.

Hence, the identifying unit 131 can calculate distance a in z direction between the left eye U1 and the fingertip U5 illustrated in FIG. 6 on the basis of z coordinate $(z_e)$ of the left eye U1 and z coordinate $(z_f)$ of fingertip U5. Furthermore, the identifying unit 131 can calculate distance b in x direction between the left eye U1 and the fingertip U5 illustrated in FIG. 6 on the basis of x coordinate $(z_e)$ of the left eye U1 and x coordinate $(x_f)$ of fingertip U5. Furthermore, the identifying unit 131 can calculate distance c between the left eye U1 and the screen 11 illustrated in FIG. 6 on the basis of z coordinate $(z_e)$ of the left eye U1 and z coordinate on the surface of the screen 11.

Because the intersection P11 is positioned on the straight line connecting the left eye U1 and the fingertip U5, x coordinate $(x_p)$ of the intersection P11 is expressed by Formula (1) below.

[Mathematical Formula 1]

$$x_p = b \times \frac{c}{a} + x_e \qquad (1)$$

Hence, the identifying unit 131 can calculate x coordinate $(x_p)$ of the intersection P11 on the basis of Formula (1).

Furthermore, the identifying unit 131 can calculate distance d in y direction between the left eye U1 and the fingertip U5 illustrated in FIG. 7 on the basis of y coordinate $(y_e)$ of the left eye U1 and y coordinate $(y_f)$ of fingertip U5.

Because the intersection P11 is positioned on the straight line connecting the left eye U1 and the fingertip U5, y coordinate $(y_p)$ of the intersection P11 is expressed by Formula (2) below.

[Mathematical Formula 2]

$$y_p = d \times \frac{c}{a} + y_e \qquad (2)$$

Hence, the identifying unit 131 can calculate y coordinate $(y_p)$ of the intersection P11 on the basis of Formula (2).

The identifying unit 131 can, for example, calculate xyz coordinate $(x_p, y_p, z_p)$ of the intersection P11 between the straight line connecting the left eye U1 and the fingertip 135 and the screen 11 in the aforementioned manner to identify the intersection P11 as an instruction position.

In the above, a description is given of the case where the position on the straight line connecting the one opened eye and the fingertip U5 is identified as an instruction position, but the instruction position identified by the identifying unit 131 is not limited to such an example.

For example, the identifying unit 131 may identify the position on an extension of fingertip U5 as an instruction position.

Figure 8:
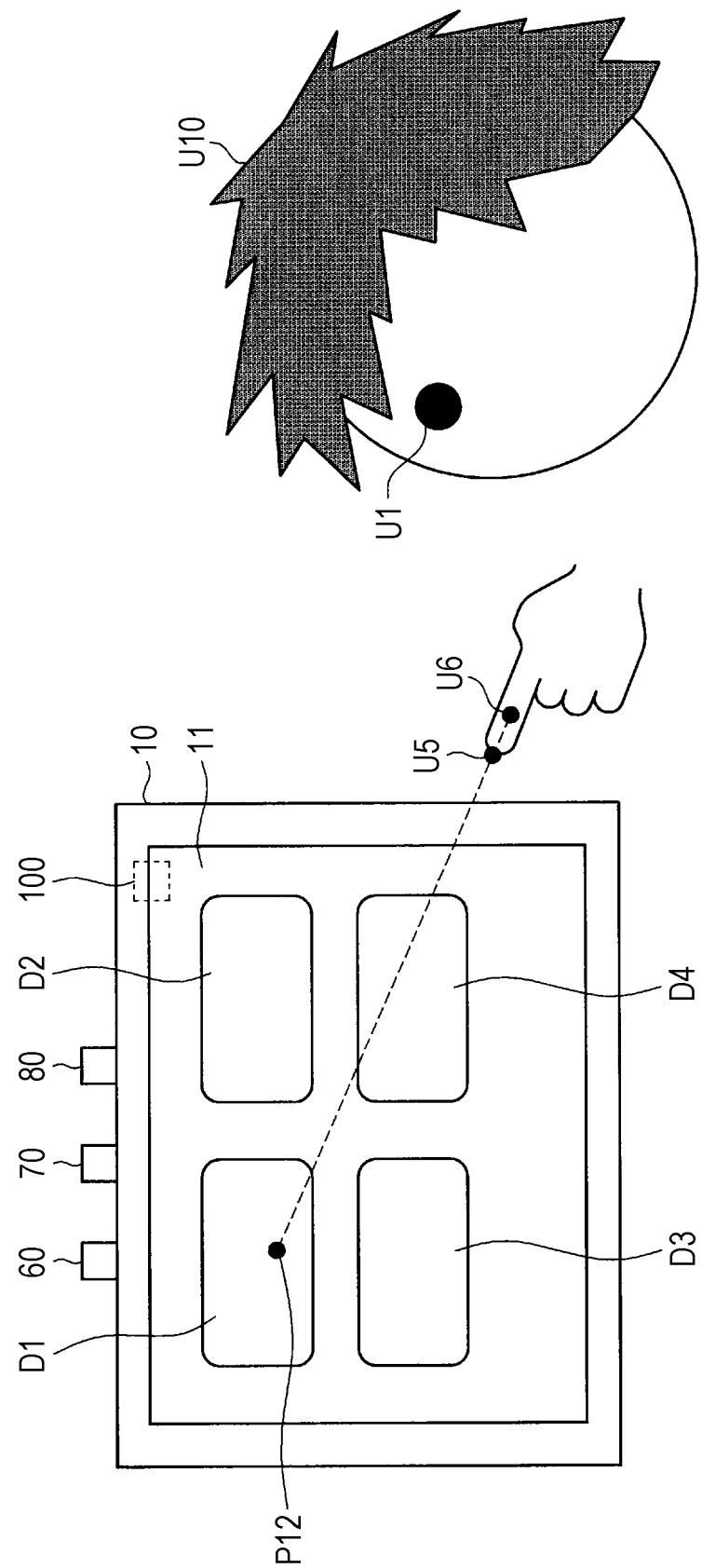
FIG. 8 is an explanatory view for explaining an example in which the position on an extension of a fingertip is identified as an instruction position.

FIG. 8 is an explanatory view for explaining an example in which the position on an extension of fingertip U5 is identified as an instruction position. Specifically, FIG. 8 illustrates an intersection P12 between the straight line connecting the fingertip U5 of the user U10 and a joint U6 of a finger corresponding to fingertip U5 and the screen 11, which is a region in which the object is arranged. In this case, the identifying unit 131 may, for example, identify the intersection P12 as av instruction position.

The detection unit 120 can extract a region showing the joint U6 of a finger of the user U10 on the depth image acquired by the finger position detection camera 80 to detect the position of the joint U6 as the position related to a finger. Hence, for example, in addition to the position of the fingertip U5, the position of the joint U6 is preliminarily detected, in step S507, such that the calculation of the position of the intersection P12 using the positions of the fingertip U5 and the joint U6 can be achieved.

Furthermore, the identifying unit 131 may switch an instruction position identifying mode between a first identifying mode in which the position on the straight line connecting the one opened eye and the fingertip U5 is identified as an instruction position and a second identifying mode in which the position on the extension of fingertip U5 is identified as an instruction position.

For example, the identifying unit 131 executes switching of the instruction position identifying mode depending on a direction of a finger of the user U10 used for instructing an instruction position.

Figure 9:
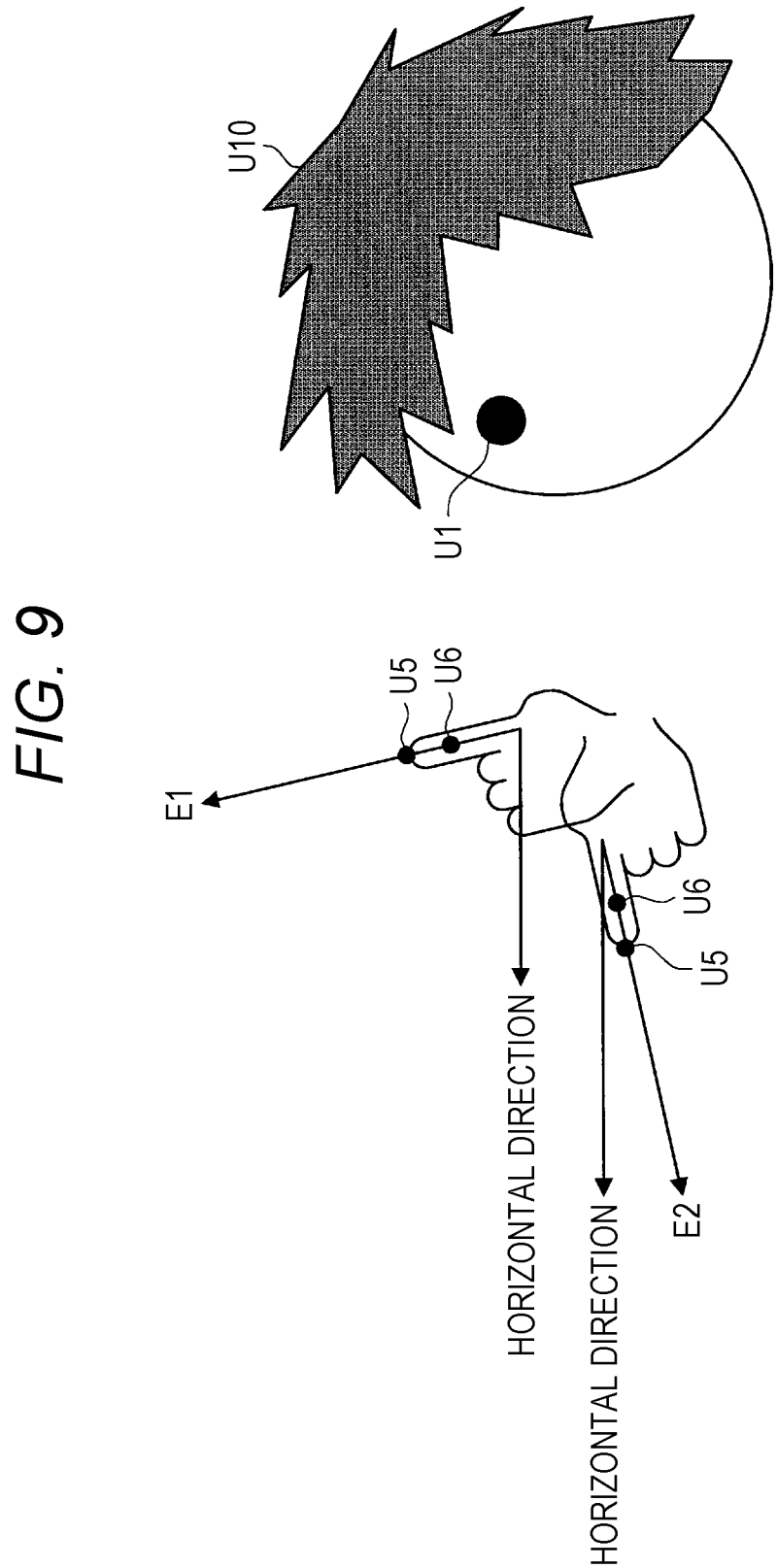
FIG. 9 is an explanatory view for explaining switching of an identifying mode depending on a direction of a finger.

FIG. 9 is an explanatory view for explaining switching of the identifying mode depending on a direction of a finger. The identifying unit 131 executes switching of the identifying mode depending on, for example, whether or not the direction of fingertip U5 is upward with respect to the horizontal direction. Specifically, the identifying unit 131, in a case where fingertip U5 is directed in a direction E1, which is upward with respect to the horizontal direction as illustrated in FIG. 9, switches the identifying mode to the first identifying mode. Meanwhile, the identifying unit 131, in a case where fingertip U5 is directed in a direction E2, which is downward with respect to the horizontal direction, switches the identifying mode to the second identifying mode.

Note that the identifying unit 131, as a direction in which fingertip U5 is directed, can, for example, apply a direction from the joint U6 of a finger to fingertip U5. In this case, the identifying unit 131 can calculate the direction in which fingertip U5 is directed on the basis of the position of the fingertip U5 and the position of the joint U6.

Furthermore, for example, the identifying unit 131 executes switching of the instruction position identifying mode depending on a distance between the one opened eye and the fingertip U5. Specifically, the identifying unit 131 executes switching of the instruction position identifying mode depending on a distance between the left eye U1 and the fingertip U5 in a case where the eye opening/closing state of the user U10 is the one-eye-closed state in which only the left eye U1 is opened.

Figure 10:
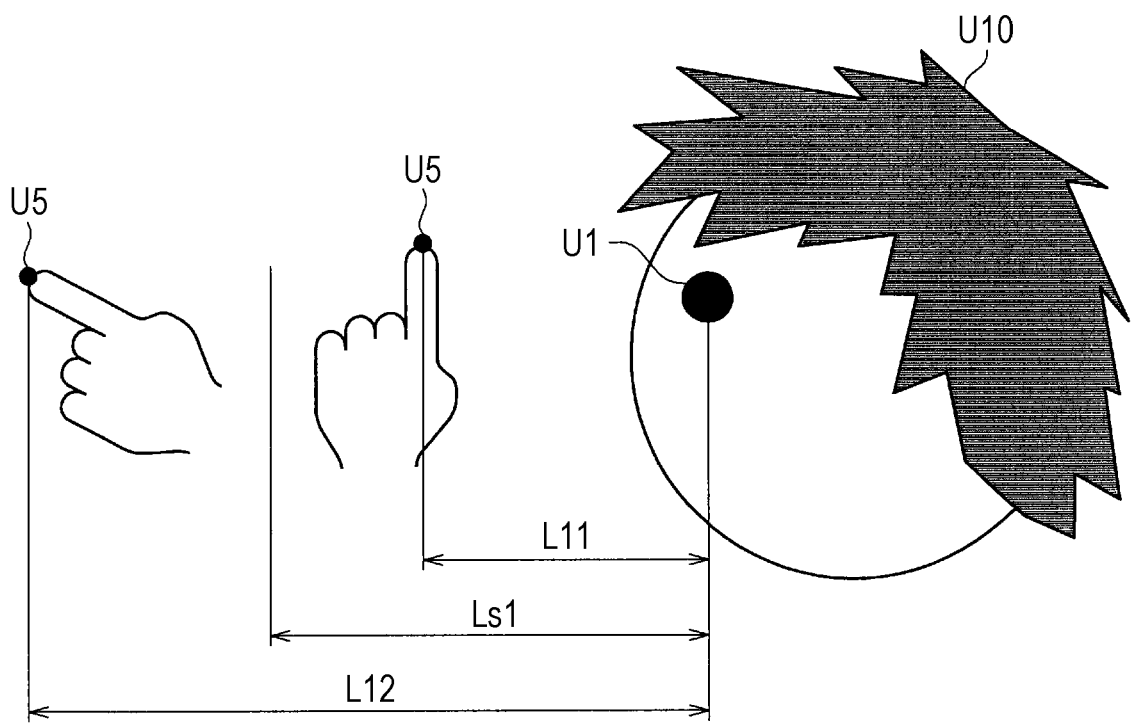
FIG. 10 is an explanatory view for explaining switching of an identifying mode depending on a distance between a left eye and a fingertip.

FIG. 10 is an explanatory view for explaining switching of the identifying mode depending on a distance between the left eye U1 corresponding to the one opened eye and the fingertip U5. The identifying unit 131 executes switching of the identifying mode depending on, for example, whether or not a distance between the left eye U1 and the fingertip U5 is shorter than a first distance threshold value Ls1. The first distance threshold value Ls1 is set, for example, to a value with which it is possible to determine whether or not the distance between the left eye U1 and the fingertip U5 is short to an extent that it is expected that the user U10 has an intension to instruct an instruction position in the first identifying mode, and can be stored in the storage element of the information processing apparatus 100. Specifically, the identifying unit 131, in a case where the distance between the left eye U1 and the fingertip U5 is distance L11, which is shorter than the first distance threshold value Ls1, as illustrated in FIG. 10, switches the identifying mode to the first identifying mode. Meanwhile, the identifying unit 131, in a case where the distance between the left eye U1 and the fingertip U5 is distance L12, which is equal to or more than the first distance threshold value Ls1, switches the identifying mode to the second identifying mode.

Note that the identifying unit 131 can calculate the distance between the left eye U1 and the fingertip U5 on the basis of the position of the left eye U1 and the position of the fingertip U5.

Thus, in the present embodiment, the identifying unit 131 identifies an instruction position instructed by a part of the body of the user U10 depending on a result of detection of the one-eye-closed state by the detection unit 120. Specifically, the identifying unit 131 identifies an instruction position in a case where the one-eye-closed state is detected.

Next, in step S513, the display control unit 134 causes the instruction position to be displayed on the display apparatus 10.

For example, the display control unit 134 causes a mark, e.g., a dot, an arrow, or the like, to be displayed at the position identified as an instruction position on the screen 11 of the display apparatus 10. Note that, regarding display of the instruction position, the shape, the size, the pattern, and the color of a mark to be displayed by the display apparatus 10 are not particularly limited.

Next, in step S515, the specifying unit 132 specifies the selection object candidate which is a candidate of an object selected by the user U10, on the basis of an instruction position.

For example, the specifying unit 132 specifies an object positioned at an instruction position as a selection object candidate.

Specifically, FIG. 1 illustrates an example in which the object D1 is positioned on the intersection P11 identified as a specification position. In this case, the specifying unit 132 specifies, for example, the object D1 as a selection object candidate.

In the above, a description is given of the case where the object positioned at an instruction position is specified as a selection object candidate, but the selection object candidate specified by the specifying unit 132 is not limited to such an example.

For example, the specifying unit 132 may specify, as a selection object candidate, an object indicated by a trajectory of an instruction position.

Figure 11:
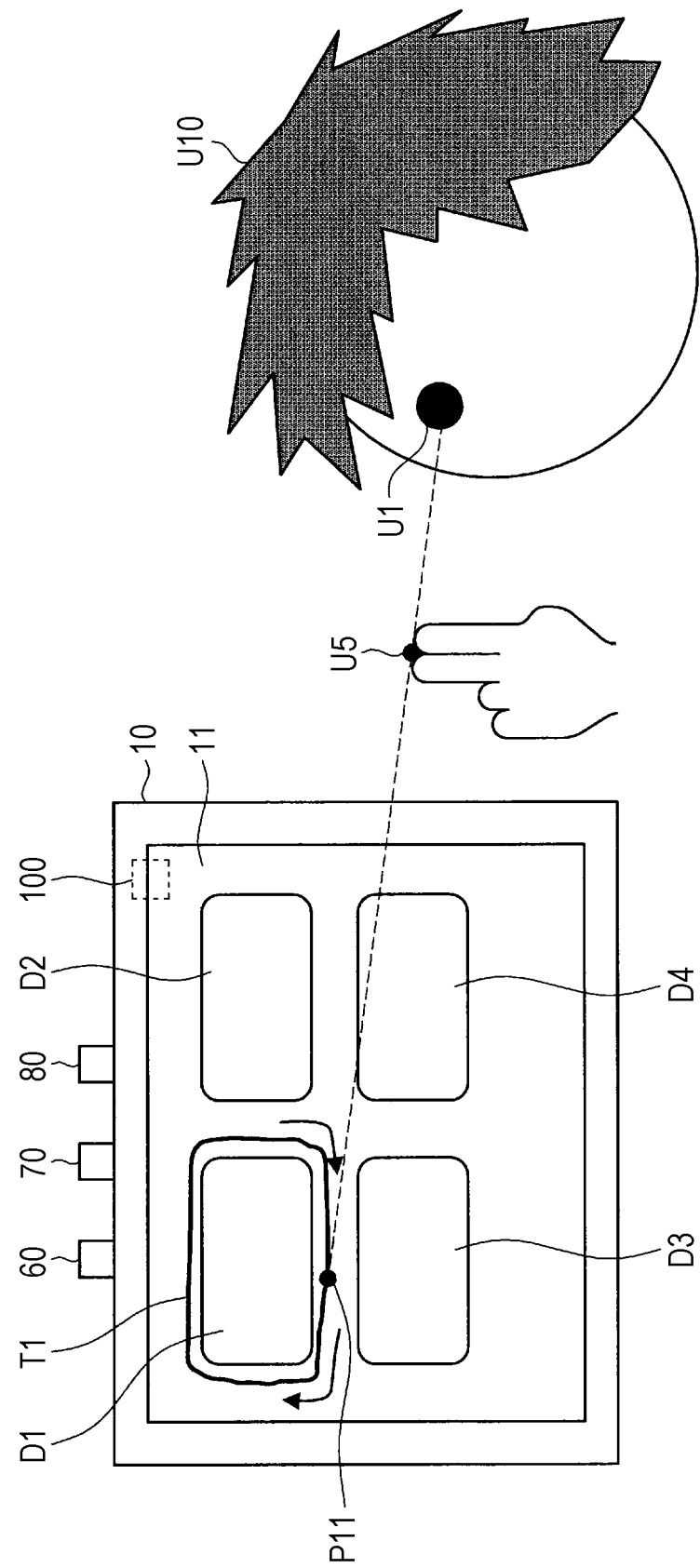
FIG. 11 is an explanatory view for explaining an example in which an object indicated by a trajectory of an instruction position is specified as a selection object candidate in a display system according to the embodiment.

FIG. 11 is an explanatory view for explaining an example in which an object indicated by a trajectory of an instruction position is specified as a selection object candidate in the display system 1 according to the present embodiment. Specifically, FIG. 11 illustrates a trajectory T1 of the intersection P11 in a case where the intersection P11 identified as an instruction position makes one round on the outer circumference side of the object D1 in response to the movement of the fingertip U5 of the user U10. In this case, the specifying unit 132 may specify, for example, the object D1 surrounded by the trajectory T1 as a selection object candidate.

As will be described later, a selection object candidate specifying mode can be switched between a first specifying mode in which an object positioned at an instruction position is specified as a selection object candidate and a second specifying mode in which an object indicated by a trajectory of an instruction position is specified as a selection object candidate. In this case, the display control unit 134 may cause, for example, the trajectory T1 to be displayed on the display apparatus 10 when the selection object candidate specifying mode is the second specifying mode.

Note that the trajectory T1 may not be a technically closed, closed loop. For example, in a case where the trajectory T1 is not a closed loop, the specifying unit 132 may specify, as a selection object candidate, an object surrounded by a trajectory, which is obtained when one end of the trajectory T1 is connected to the other end. Furthermore, the object specified as a selection object candidate by the specifying unit 132 is not limited to the object surrounded by the trajectory T1. For example, the specifying unit 132 may specify an object positioned at a central position of the trajectory T1 as a selection object candidate.

The specifying unit 132 may specify objects indicated by trajectories of a plurality of instruction positions as a selection object candidate.

Figure 12:
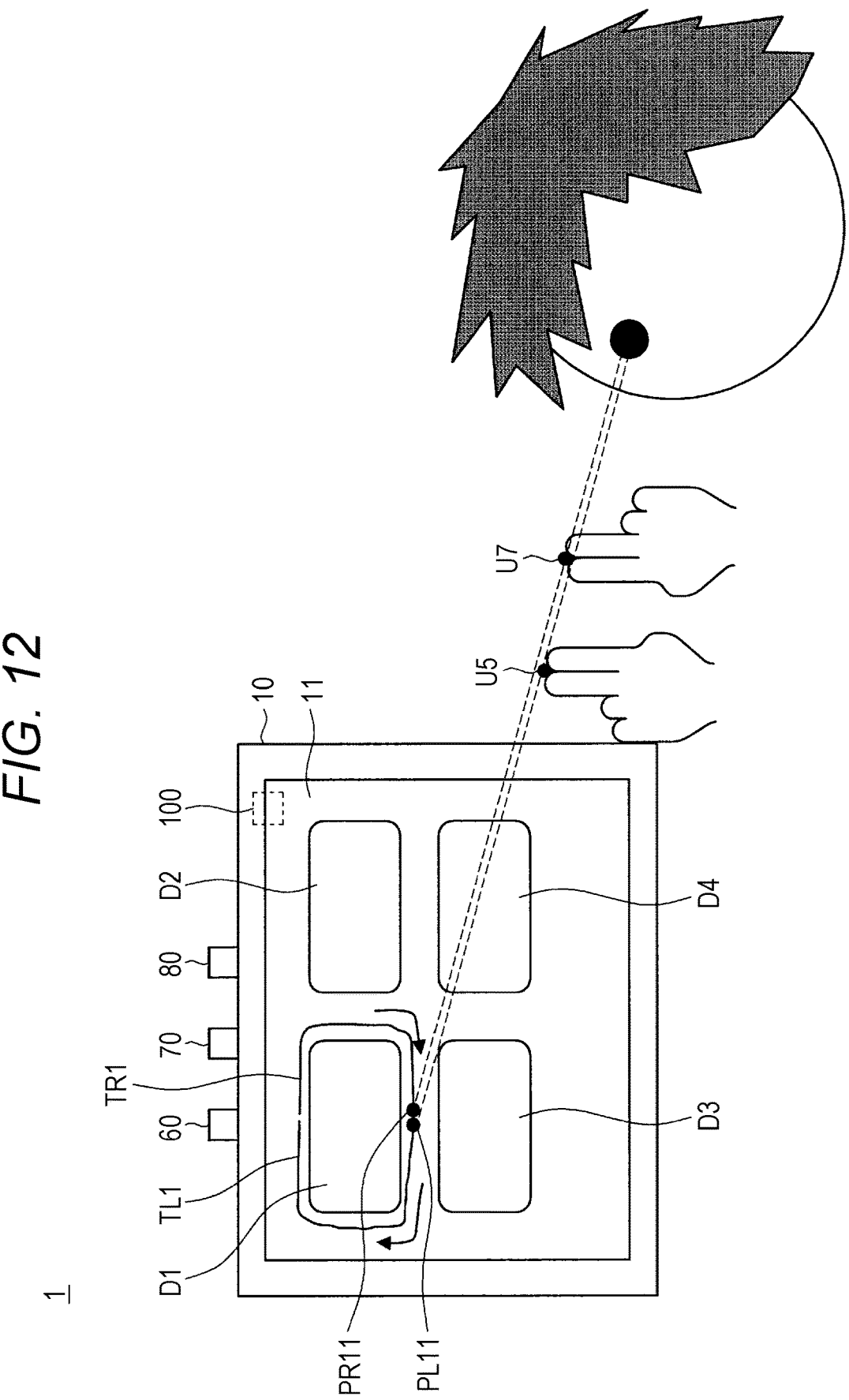
FIG. 12 is an explanatory view illustrating an example in which objects indicated by trajectories of a plurality of instruction positions are specified as selection object candidates in the display system according to the embodiment.

FIG. 12 is an explanatory view illustrating an example in which objects indicated by trajectories of a plurality of instruction positions are specified as a selection object candidate in the display system 1 according to the present embodiment. Specifically, FIG. 12 illustrates an example in which, in addition to the left-hand fingertip U5, right-hand fingertip U7 is used to specify an instruction position. FIG. 12 illustrates a trajectory TL1 of the intersection PL11 in a case where the intersection PL11 identified as an instruction position instructed by the left-hand fingertip U5 is moved on the outer circumference side of the object D1 from the top through the left side to the bottom of the object D1 in response to the movement of the left-hand fingertip U5 of the user U10. Furthermore, FIG. 12 illustrates a trajectory TR1 of the intersection PR11 in a case where the intersection PR11 identified as an instruction position instructed by right-hand fingertip U7 is moved on the outer circumference side of the object D1 from the top through the right side to the bottom of the object D1 in response to the movement of right-hand fingertip U7 of the user U10. In this case, the specifying unit 132 may specify, for example, the object D1 surrounded by the trajectory TL1 and the trajectory TR1 as a selection object candidate.

Furthermore, the specifying unit 132 may switch the selection object candidate specifying mode between a first specifying mode in which an object positioned at an instruction position is specified as a selection object candidate and a second specifying mode in which an object indicated by a trajectory of an instruction position is specified as a selection object candidate.

For example, the specifying unit 132 may execute switching of the selection object candidate specifying mode depending on the shape of a part of the body of the user U10.

The specifying unit 132, in a case where the number of raising fingers of a hand used to instruct an instruction position is one, as illustrated, for example, in FIG. 1, may switch the selection object candidate specifying mode to the first specifying mode. Meanwhile, the specifying unit 132, in a case where the number of raising fingers of a hand used to instruct an instruction position is two, as illustrated, for example, in FIG. 11, may switch the selection object candidate specifying mode to the second specifying mode.

Furthermore, the specifying unit 132 may execute switching of the selection object candidate specifying mode depending on the shape of a hand not used to instruct an instruction position. For example, in a case where the left hand is used to instruct an instruction position, the specifying unit 132 may execute switching of the selection object candidate specifying mode depending on which shape: rock, scissors, and paper, the shape of a right hand is.

Note that the aforementioned detection of the shape of the hand of the user U10 can be executed by the detection unit 120. Specifically, the detection of the shape of the hand of the user U10 can be executed on the basis of the feature amount of a depth image acquired by the finger position detection camera 80 by using a statistical model learned according to an algorithm such as boosting.

Next, in step S517, the display control unit 134 causes the selection object candidate to be displayed on the display apparatus 10 in an emphasized manner.

For example, the display control unit 134 changes the color of the object specified as a selection object candidate on the screen 11 of the display apparatus 10 to a color different from the color of another object. Note that, emphasize display of the selection object candidate is not particularly limited to such an example.

Next, in step S519, the decision unit 133 determines whether or not the decision movement by a part of the body of the user U10 has been detected. In a case where it is determined that the decision movement has been detected (step S519/YES), the step proceeds to step S521. Meanwhile, in a case where it is not determined that the decision movement has been detected (step S519/NO), the processing flow illustrated in FIG. 5 ends.

For example, the decision unit 133 determines that the decision movement has been detected in a case where movement of closing both eyes is detected. Specifically, the decision unit 133 may determine that the decision movement has been detected when the both-eyes-closed state is detected over setting time continuously.

Note that the decision movement is not limited to such an example, but may be a different movement. For example, the decision movement may be movement by a hand of the user U10. Specifically, the decision movement can include movements, e.g., movement of bringing the fingertip U5 used to instruct an instruction position closer to a selection object candidate, movement of clenching a hand not used to instruct an instruction position, movement of changing a hand to a predetermined shape, or the like.

In step S521, the decision unit 133 decides the selection object candidate as a selection object, which is an object selected by the user U10. Thus, the decision unit 133 decides the selection object candidate as a selection object in a case where the decision movement by a part of the body of the user U10 is detected.

In step S523, the information processing apparatus 100 outputs a control command depending on the decided selection object.

Specifically, the communication unit 110 of the information processing apparatus 100 transmits a control command for achieving manipulation corresponding to the decided selection object, to an apparatus external to the information processing apparatus 100. For example, the communication unit 110 transmits a control command for achieving manipulation corresponding to the decided selection object, to the display apparatus 10, Note that the communication unit 110 may transmit a control command for achieving manipulation corresponding to the decided selection object to an apparatus different from the display apparatus 10.

Next, the processing flow illustrated in FIG. 5 ends.

3. Effect of Information Processing Apparatus

Next, an effect of the information processing apparatus 100 according to the present embodiment is described.

With the information processing apparatus 100 according to the present embodiment, an instruction position instructed by a part of the body of the user U10 is identified depending on a result of detection of the one-eye-closed state. Here, movement, of bringing the eye opening/closing state into the one-eye-closed state is movement that is consciously performed by the user U10 unlike other movements related to opening/closing of an eye. For example, the movement of bringing the eye opening/closing state into the both-eyes-closed state, which is movement that occurs at the time of blink, is movement that can be unconsciously performed by the user U10. Hence, when an instruction position instructed by a part of the body of the user U10 is identified depending on a result of detection of the one-eye-closed state, it is possible to prevent manipulation of a device from being executed in a case where the user U10 unconsciously moves a part of the body without an intension of manipulating the device. Thus, it is possible to increase the manipulability for manipulation of a device by means of an instruction using a part of the body of the user U10.

Moreover, in the present embodiment, because an instruction position instructed by a part of the body of the user U10 is identified, it is possible for the user U10 to manipulate the device by means of an instruction using a part of a body without wearing an apparatus. Hence, it is possible to achieve intuitive manipulation of the device.

Furthermore, with the information processing apparatus 100 according to the present embodiment, the position on the straight line connecting the one opened eye and the fingertip U5 of the user U10 can be identified as an instruction position. Thus, the user U10 can give an intuitive instruction using a hand. In particular, when the position on the straight line connecting the one opened eye and the fingertip U5 is identified as an instruction position, the user U10 can give an intuitive instruction with coordination between the movement of the fingertip U5 and the movement of the instruction position.

Furthermore, with the information processing apparatus 100 according to the present embodiment, the position on the extension of the fingertip U5 of the user U10 can be identified as an instruction position. Thus, the user U10 can give an intuitive instruction using a hand. In particular, the user U10 can give an intuitive instruction with a feeling similar to an instruction using a laser pointer when the position on the extension of the fingertip U5 is identified as an instruction position.

Furthermore, with the information processing apparatus 100 according to the present embodiment, the instruction position identifying mode can be switched between a first identifying mode in which the position on the straight line connecting the one opened eye and the fingertip U5 of the user U10 is identified as an instruction position and a second identifying mode in which the position on the extension of the fingertip U5 is identified as an instruction position. Here, which identifying mode: the first identifying mode and the second identifying mode can achieve a more intuitive instruction can vary depending on the position or attitude of a finger of the user U10 used to instruct an instruction position. Hence, when the instruction position identifying mode can be switched between the first identifying mode and the second identifying mode, it is possible to effectively achieve an intuitive instruction by the user U10.

Furthermore, with the information processing apparatus 100 according to the present embodiment, switching of the instruction position identifying mode can be executed depending on the direction of a finger of the user U10 used to instruct an instruction position. Here, which identifying mode: the first identifying mode and the second identifying mode can achieve a more intuitive instruction can vary depending on the direction of a finger of the user U10. For example, in the instruction in the first identifying mode, the fingertip U5 is likely to be directed upward with respect to the horizontal direction. Meanwhile, in the instruction in the second identifying mode, the fingertip U5 is likely to be directed downward with respect to the horizontal direction. Hence, when switching of the identifying mode is executed depending on the direction of the fingertip U5, it is possible to more effectively achieve an intuitive instruction by the user U10.

Furthermore, with the information processing apparatus 100 according to the present embodiment, switching of the instruction position identifying mode can be executed depending on the distance between the one opened eye and the fingertip U5. Here, which identifying mode: the first identifying mode and the second identifying mode can achieve a more intuitive instruction can vary depending on the distance between the one opened eye and the fingertip U5. For example, in the instruction in the first identifying mode, the distance between the one opened eye and the fingertip U5 is likely to be relatively short. Meanwhile, in the instruction in the second identifying mode, the distance between the one opened eye and the fingertip U5 is likely to be relatively long. Hence, when switching of the identifying mode is executed depending on the distance between the one opened eye and the fingertip U5, it is possible to more effectively achieve an intuitive instruction by the user U10.

Furthermore, with the information processing apparatus 100 according to the present embodiment, a selection object candidate, which is a candidate of an object selected by the user U10 can be specified on the basis of an instruction position. Thus, a selection object candidate can be properly specified depending on an instruction given by the user U10.

Furthermore, with the information processing apparatus 100 according to the present embodiment, an object positioned at an instruction position can be specified as a selection object candidate. Thus, a selection object candidate can be specified in a relatively simple procedure.

Furthermore, with the information processing apparatus 100 according to the present embodiment, an object indicated by a trajectory of an instruction position can be specified as a selection object candidate. Thus, for example, in a case where a plurality of objects is brought closer, it is possible to prevent an object not intended by the user U10 from being specified as a selection object candidate. Hence, a selection object candidate can be specified more precisely.

Furthermore, with the information processing apparatus 100 according to the present embodiment, the selection object candidate specifying mode can be switched between the first specifying mode in which an object positioned at an instruction position is specified as a selection object candidate and the second specifying mode in which an object indicated by a trajectory of an instruction position is specified as a selection object candidate. Thus, the selection object candidate specifying mode can be switched depending on situations, e.g., the number or arrangement of objects.

Furthermore, with the information processing apparatus 100 according to the present embodiment, switching of the selection object candidate specifying mode can be executed depending on the shape of a part of the body of the user U10. Thus, the user U10 can switch the specifying mode without wearing an apparatus.

Furthermore, with the information processing apparatus 100 according to the present embodiment, in a case where a decision movement by a part of the body of the user U10 is detected, the selection object candidate can be decided as a selection object, which is an object selected by the user U10. Thus, the user U10 can select an object desired by the user U10 without wearing an apparatus.

Furthermore, with the information processing apparatus 100 according to the present embodiment, the selection object candidate can be displayed in an emphasised manner by the display apparatus 10. Thus, the user U10 can properly recognise a specified selection object candidate, and can prevent an object not intended by the user U10 from being decided to be a selection object.

Furthermore, with the information processing apparatus 100 according to the present embodiment, an instruction position can be displayed by the display apparatus 10. Thus, the user U10 can recognize an identified instruction position and smoothly achieve selection of an object desired by the user U10.

Furthermore, with the information processing apparatus 100 according to the present embodiment, specifically, in a case where the one-eye-closed state is detected, an instruction position can be identified. As described above, movement of bringing the eye opening/closing state to the one-eye-closed state is movement that is consciously performed by the user U10. Hence, when an instruction position is identified in a case where the one-eye-closed state is detected, it is possible to effectively prevent manipulation of a device from being executed in a case where the user U10 unconsciously moves a part of the body without intention of manipulation of the device.

Moreover, in the case of the both-eyes-opened state, because one of the finger used to instruct an instruction position and an object that can be selected, which is not focused by the user U10, looks double, it can be difficult to properly select an object desired by the user U10. Thus, manipulability for manipulation of a device by means of an instruction using a part of the body of the user U10 can be reduced. Here, when an instruction position is identified in a case where the one-eye-closed state is detected, it is possible to prevent a situation where one of the finger used to instruct an instruction position and an object that can be selected, which is not focused by the user U10, looks double. Hence, manipulability for manipulation of a device by means of an instruction using a part of the body of the user U10 can be increased more effectively.

4. VARIATIONS

Next, variations are described.
(4-1. First Variation)
First, a display system 2 according to a first variation is described with reference to FIGS. 13 and 14.

Figure 13:
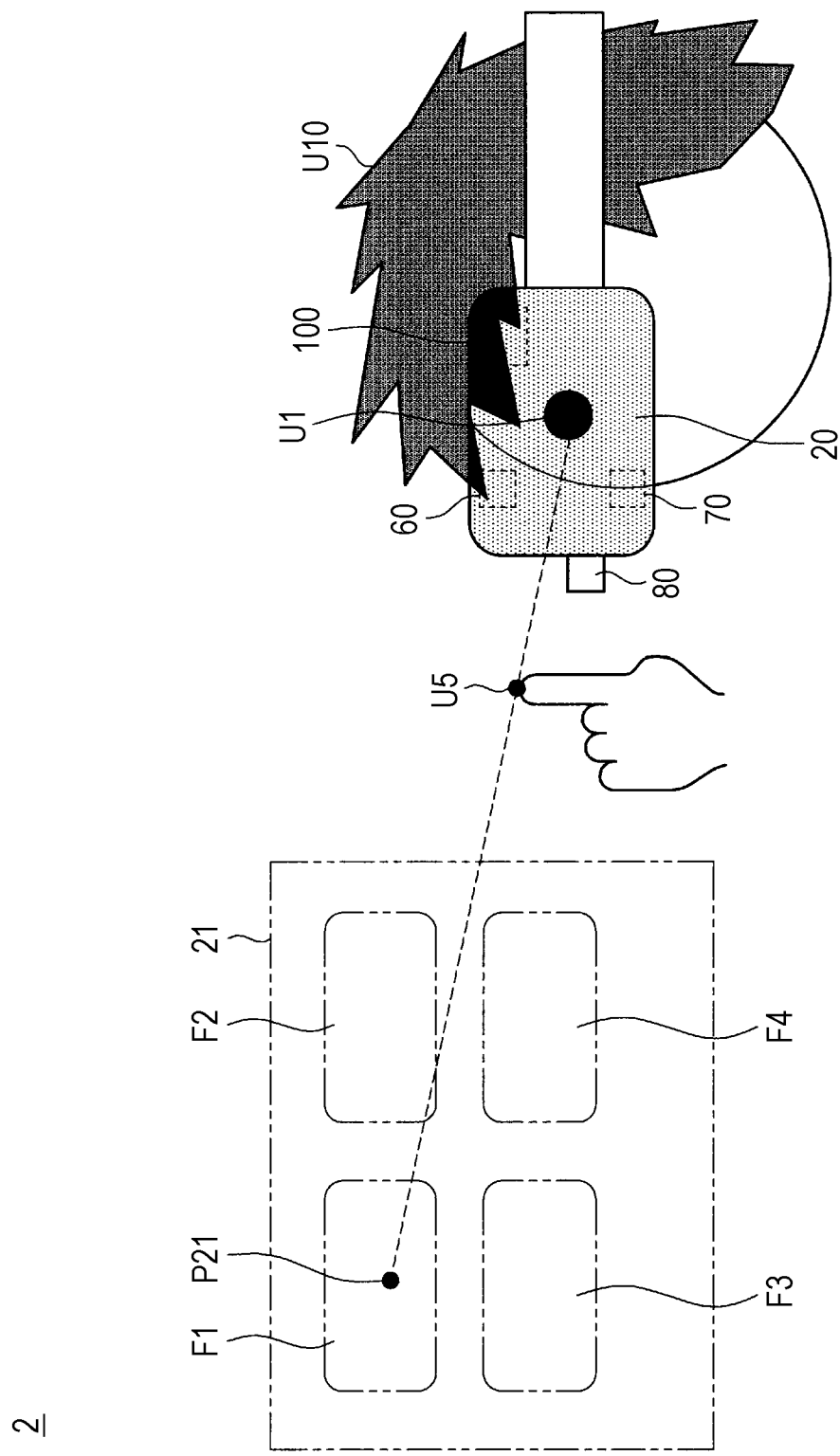
FIG. 13 is a schematic view illustrating an example of a schematic configuration of a display system according to a first variation.

FIG. 13 is a schematic view illustrating an example of a schematic, configuration of the display system 2 according to the first variation.

The display system 2 is a system using virtual reality (VR) that provides a user interface for achieving an intuitive manipulation of the display apparatus 20, which is a head mounted display that presents a virtual space 21 to a user U10.

The display system 2, as illustrated, for example, in FIG. 13, includes a display apparatus 20, an eye opening/closing detection camera 60, an eye position detection camera 70, a finger position detection camera 80, and an information processing apparatus 100.

The display apparatus 20 is an apparatus that is used in a state of being worn on the head of a user U10 and presents the virtual space 21, which is a virtual space involving a sense of reality by displaying various images. Note that an image displayed by the display apparatus 20 can include a moving image in addition to a still image. The display apparatus 20 displays various objects in the virtual space 21. For example, FIG. 13 illustrates an example in which objects FI to F4 are displayed in the virtual space 21. Note that, objects FI to F4 may be, for example, a widget, e.g., a button, or may be a character, an icon or the like of a game image.

With the display system 2, the user U10 can manipulate the display apparatus 20 by means of an instruction using a part of the body of the user U10. For example, the user U10 can select any of objects FI to F4 by means of an instruction using an eye, a fingertip, or the like, to perform manipulation corresponding to each object. Note that FIG. 13 illustrates, as an example, a status in which object FI is selected by an instruction using a left eye U1 and a left-hand fingertip U5 of the user U10.

With the display system 2, the eye opening/closing detection camera 60 is provided, for example, at a portion of the display apparatus 20 facing the face of the user U10 when worn. Furthermore, the eye position detection camera 70 is provided, for example, at a portion of the display apparatus 20 facing the face of the user U10 when worn. Furthermore, the finger position detection camera 80 is provided, for example, at a portion of the display apparatus 20 opposite the portion facing the face of the user U10 when worn. Furthermore, the information processing apparatus 100 is incorporated, for example, in the display apparatus 20.

With the display system 2, similar to the display system 1, the information processing apparatus 100 can, for example, execute the processing flow illustrated in FIG. 5.

In a case where the one-eye-closed state is detected, the identifying unit 131, similar to the display system 1, identifies, in step S511, an instruction position instructed by a part of the body of the user U10. For example, the identifying unit 131, similar to the display system 1, identifies the position on the straight line connecting one opened eye and the fingertip U5 as an instruction position.

Specifically, FIG. 13 illustrates an intersection P21 between the straight line connecting a left eye U1 corresponding to the one opened eye and a fingertip U5 and a region of the virtual space 21 in which an object is arranged. In this case, the identifying unit 131 identifies, for example, the intersection P21 as an instruction position.

Information indicating the position of the region of the virtual space 21 in which an object is arranged can be preliminarily stored, for example, in the storage element of the information processing apparatus 100. Hence, the identifying unit 131 can calculate the position of the intersection P21 on the basis of the position of the left eye U1 and the position of the fingertip U5 detected by the detection unit 120.

Note that the identifying unit 131, similar to the display system 1, may identify the position on the extension of the fingertip U5 as an instruction position. Specifically, the identifying unit 131 may identify an intersection between the straight line connecting the fingertip U5 of the user U10 and a joint of the finger corresponding to the fingertip U5 and a region of the virtual space 21 in which an object is arranged as an instruction position. Furthermore, the identifying unit 131, similar to the display system 1, may switch the instruction position identifying mode between the first identifying mode in which the position on the straight line connecting the one opened eye and the fingertip U5 is identified as an instruction position and the second identifying mode in which the position on the extension of the fingertip U5 is identified as an instruction position.

Here, with the display system 2, a plurality of objects can be displayed in the virtual space 21. Hence, in some cases, there is a plurality of instruction position candidates, which is a candidate of an instruction position instructed by a part of the body of the user U10. The identifying unit 131, in a case where there is a plurality of instruction position candidates regarding an instruction position instructed at least using the fingertip U5 of the user U10, may identify an instruction position from the plurality of instruction position candidates on the basis of the distance between the left eye U1 corresponding to the one opened eye and the fingertip U5.

Figure 14:
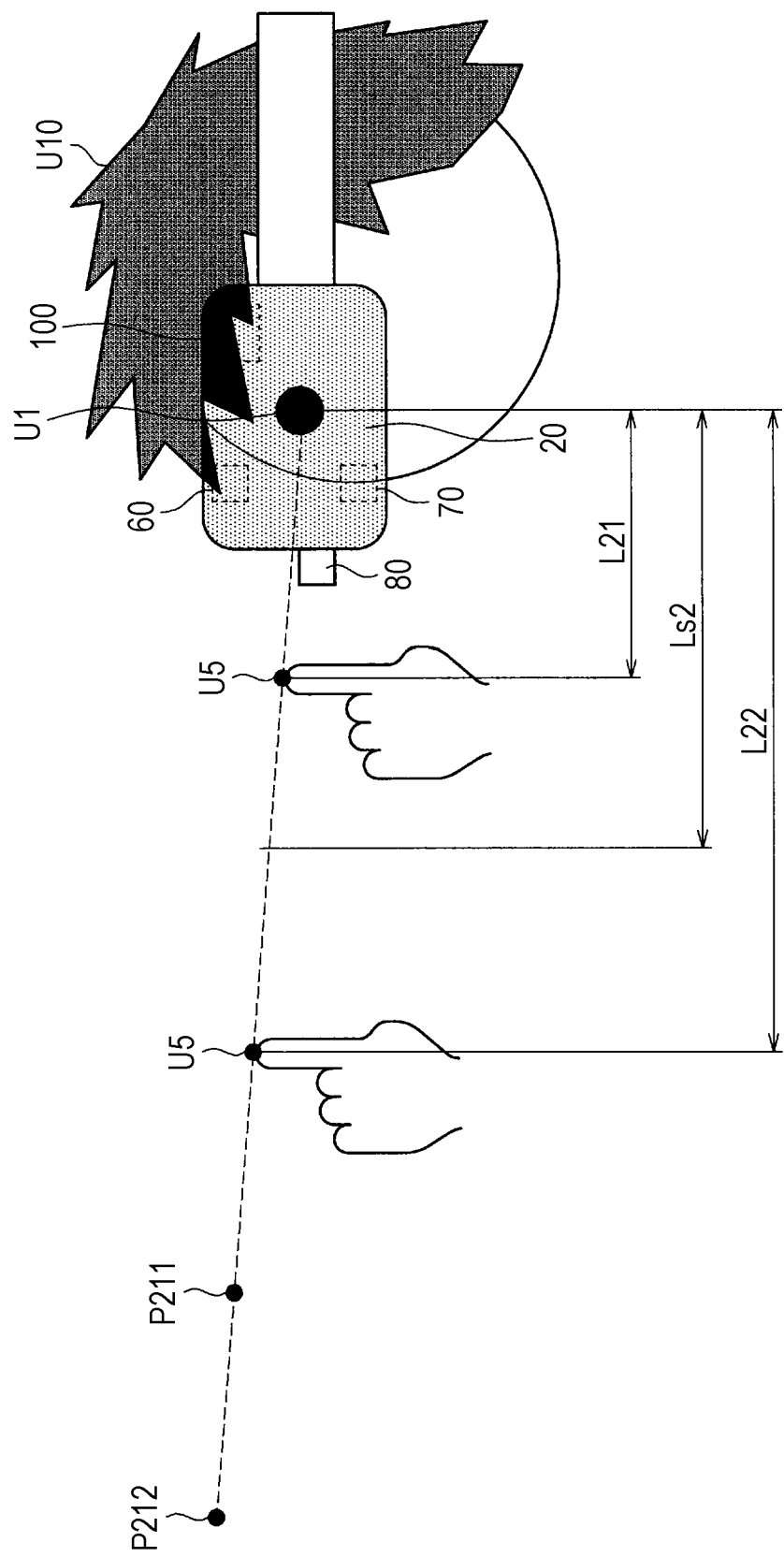
FIG. 14 is an explanatory view for explaining identification of an instruction position in a case where there is a plurality of instruction position candidates.

FIG. 14 is an explanatory view for explaining identification of an instruction position in a case where there is a plurality of instruction position candidates. FIG. 14 illustrates an example in which an intersection P211 and an intersection P212 are present as intersections between the straight line connecting the left eye U1 corresponding to the one opened eye and the fingertip U5 and a region of the virtual space 21 in which an object is arranged. The intersection P211 and the intersection P212 correspond to the plurality of instruction position candidates.

The identifying unit 133 identifies one of the intersection P211 or the intersection P212 as an instruction position, for example, depending on whether or not the distance between the left eye U1 and the fingertip U5 is shorter than a second distance threshold value Ls2. The second distance threshold value Ls2 is set, for example, to a value with which it is possible to determine whether or not the distance between the left eye U1 and the fingertip U5 is short to an extent that it is expected that the user U10 has an intention of instructing an intersection closer to the user U10, and can be stored in the storage element of the storage element of the information processing apparatus 100. Specifically, the identifying unit 131, in a case where the distance between the left eye U1 and the fingertip U5 is distance L21 shorter than the second distance threshold value Ls2 as illustrated in FIG. 14, identifies the intersection P211 closer to the user U10 as an instruction position. Meanwhile, the identifying unit 131, in a case where the distance between the left eye U1 and the fingertip 135 is distance L22 equal to or more than the second distance threshold value Ls2, identifies the intersection P212 farther from the user U10 as an instruction position.

In the above, the processing of identifying an instruction position is described, but, with the display system 2, similar to the display system 1, the information processing apparatus 100 can, for example, execute different processing.

For example, FIG. 13 illustrates an example in which object FI is positioned on the intersection P21 identified as a specification position. In this case, the specifying unit 132, for example, specifies object FI positioned on the intersection P21 identified as a specification position as a selection object candidate. Note that the specifying unit 132, similar to the display system 1, may specify, as a selection object candidate, an object indicated by a trajectory of an instruction position. With the display system 2 using virtual reality, in some cases, a plurality of objects looks double in the virtual space 21. In such a case, when an object indicated by a trajectory of an instruction position is specified as a selection object candidate, the selection object candidate can be specified more precisely.

Furthermore, the specifying unit 132, similar to the display system 1, may switch the selection object candidate specifying mode between the first specifying mode in which an object positioned at an instruction position is specified as a selection object candidate and the second specifying mode in which an object indicated by a trajectory of an instruction position is specified as a selection object candidate.

In the first variation, in a case where there is a plurality of instruction position candidates, which is a candidate of an instruction position, an instruction position can be identified from the plurality of instruction position candidates on the basis of the distance between the one opened eye and the fingertip U5. Here, in a case where there is a plurality of instruction position candidates, the closer the instruction position intended by the user U10 to the user U10, the shorter the distance between the one opened eye and the fingertip U5 is likely to be. Hence, when an instruction position is identified from a plurality of instruction position candidates on the basis of the distance between the one opened eye and the fingertip U5, an instruction position can be properly identified from the plurality of instruction position candidates along an intension of the user U10. Thus, it is possible to further effectively achieve an intuitive instruction by the user U10.

(4-2. Second Variation)

Next, a display system 3 according to a second variation is described with reference to FIGS. 15 to 19.

Figure 15:
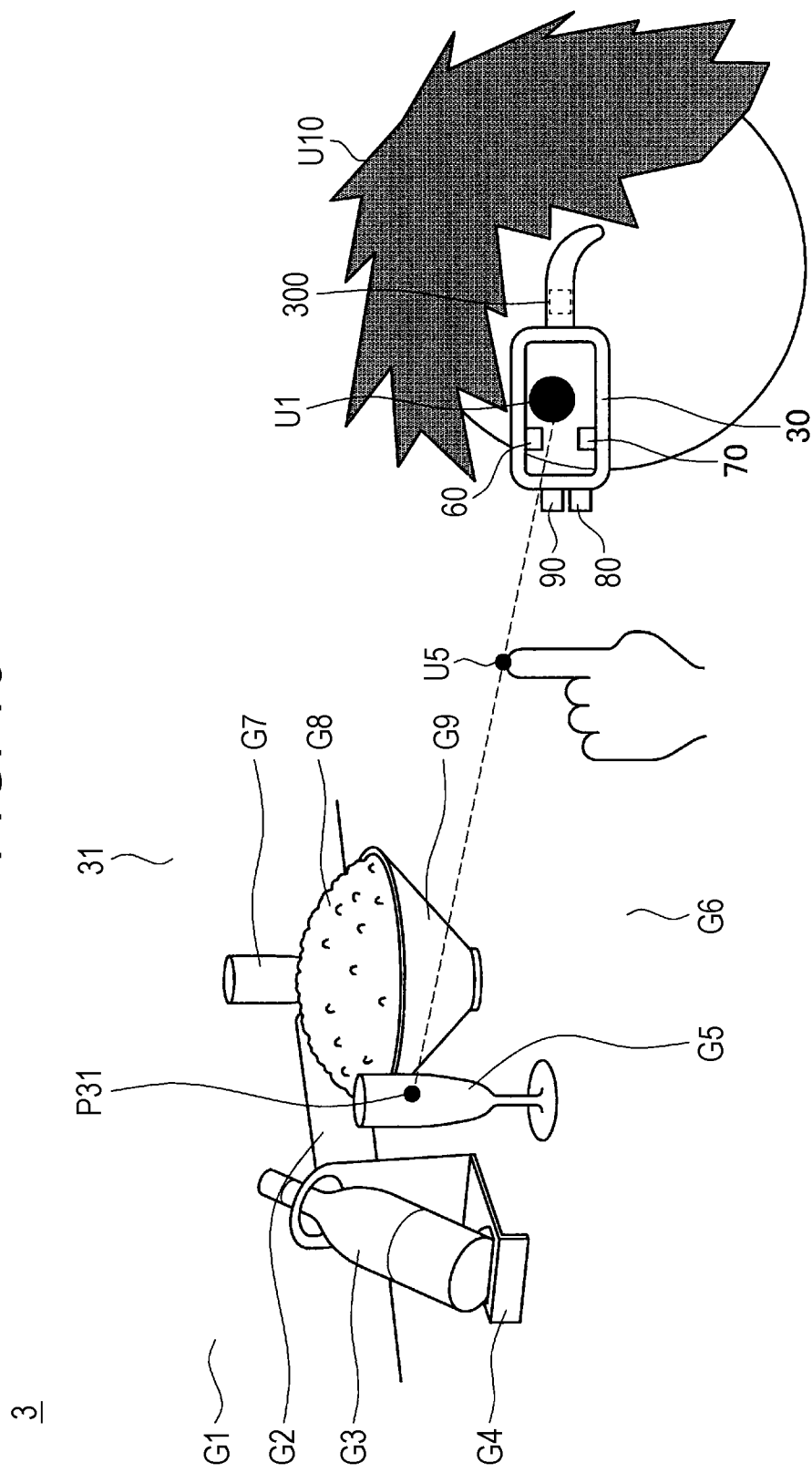
FIG. 15 is a schematic view illustrating an example of a schematic configuration of a display system according to a second variation.

FIG. 15 is a schematic view illustrating an example of a schematic configuration of the display system 3 according to the second variation.

The display system 3 is a system using augmented reality (AR) that provides a user interface for achieving intuitive manipulation of the display apparatus 30, which is a glasses-type head mounted display that displays various images in a real space 31 in a superimposing manner.

The display system 3, as illustrated, for example, in FIG. 15, includes a display apparatus 30, an eye opening/closing detection camera 60, an eye position detection camera 70, a finger position detection camera 60, a real space camera 90, and an information processing apparatus 300.

The display apparatus 30 is an apparatus that is used in a state of being worn on the head of the user U10 and displays various images in a superimposing manner in the real space 31 within a field of vision of the user U10. Note that an image displayed by the display apparatus 30 can include a moving image in addition to a still image. In the real space 31, various real objects as an object can be present. For example FIG. 15 illustrates an example in which real objects G1 to G9 are displayed in the real space 31. Note that FIG. 15 specifically illustrates, as the real objects G1 to G5, a wall, a chair, a bottle, a bottle rack, a first cup, a desk, a second cup, a food, and a dish.

With the display system 3, the user U10 can manipulate the display apparatus 30 by means of an instruction using a part of the body of the user U10. For example, the user U10 can select any of the real objects G1 to G9 by means of an instruction using an eye, a fingertip, or the like to perform manipulation corresponding to each real object. Note that FIG. 15 illustrates an example of a status in which the real object G5 is selected by an instruction using the left eye U1 and the left-hand fingertip U5 of the user U10.

With the display system 3, the eye opening/closing detection camera 60 is provided, for example, at a portion of the display apparatus 30 facing the face of the user U10 when worn. Furthermore, the eye position detection camera 70 is provided, for example, at a portion of the display apparatus 30 facing the face of the user U10 when worn. Furthermore, the finger position detection camera 80 is provided, for example, at a portion opposite the portion of the display apparatus 30 facing the face of the user U10 when worn.

Furthermore, the information processing apparatus 300 is incorporated, for example, in the display apparatus 30.

The real space camera 90 acquires, by means of imaging, an image used for various processing related to a real object present in the real space 31 within a field of vision of the user U10. Specifically, the real space camera 90 acquires, by means of imaging, a depth image showing a real object present in the real space 31 within a field of vision of the user U10 as an image used for detecting the position of a region of the real space 31 in which a real object is arranged. Furthermore, the real space camera 90 acquires, by means of imaging, a two-dimensional image showing a real object present in the real space 31 within a field of vision of the user U10 as an image used for recognition of the type and position of each real object in the real space 31. The real space camera 90 is provided, for example, at a portion opposite the portion of the display apparatus 30 facing the face of the user U10 when worn.

Figure 16:
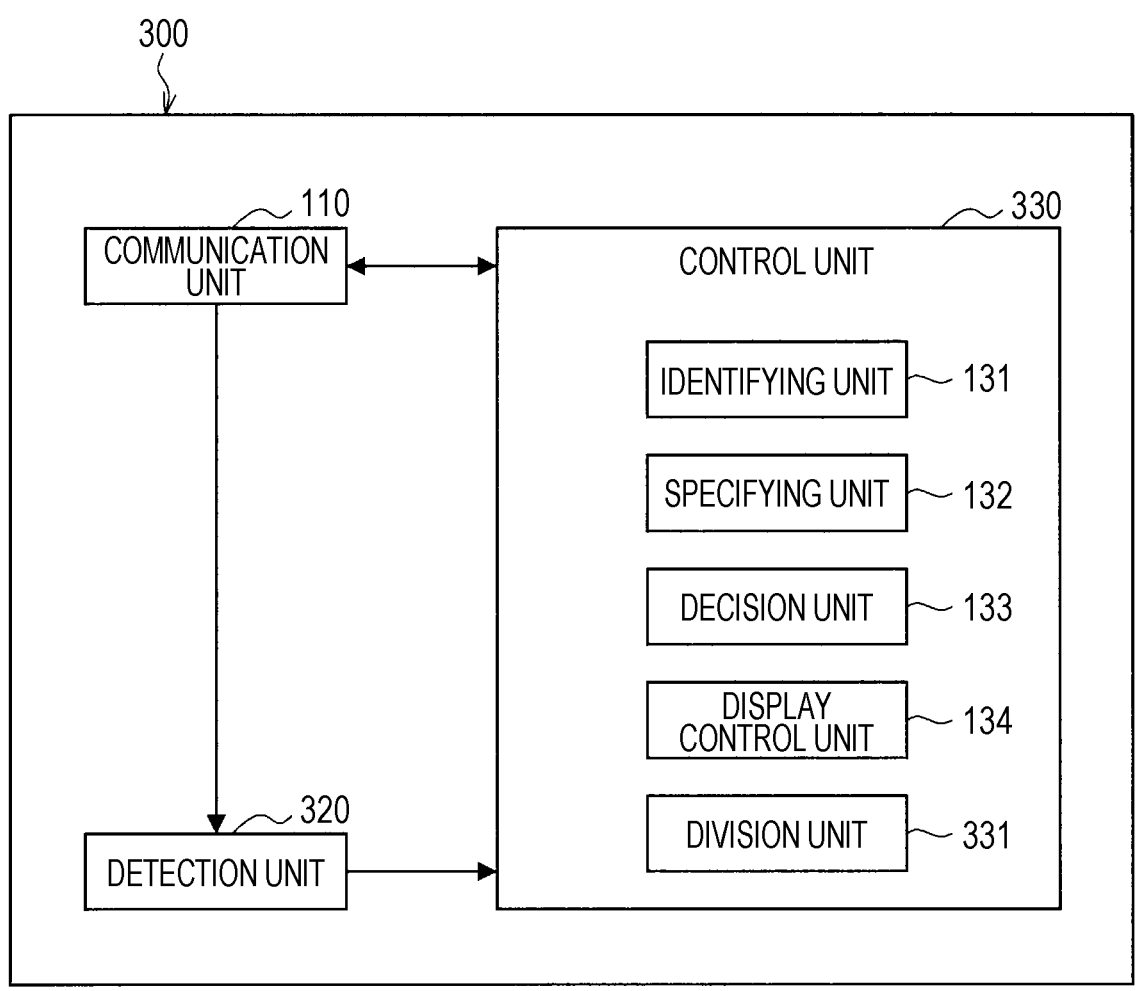
FIG. 16 is a block diagram illustrating an example of a functional configuration of an information processing apparatus according to a second variation.

FIG. 16 is a block diagram illustrating an example of a functional configuration of the information processing apparatus 300 according to the second variation.

The information processing apparatus 300, as illustrated, for example, in FIG. 16, includes a communication unit 110, a detection unit 320, and a control unit 330.

With the information processing apparatus 300, the communication unit 110 receives, from the real space camera 90, a depth image showing a real object, present in the real space 31 within a field of vision of the user U10 acquired by the real space camera 90 and further outputs it to the detection unit 320. Furthermore, the communication unit 110 receives, from the real space camera 90, a two-dimensional image acquired by the real space camera 90 and showing a real object present in the real space 31 within a field of vision of the user U10, and outputs it to the control unit 330.

The detection unit 320, as compared with the detection unit 120 of the aforementioned information processing apparatus 100, further includes a function of detecting the position of the region of the real space 31 in which a real object is arranged on the basis of the depth image acquired by the real space camera 90.

The control unit 330, as compared with the control unit 130 of the aforementioned information processing apparatus 100, further includes a division unit 331.

The division unit 331 divides a two-dimensional image acquired by the real space camera 90 and showing the real object present in the real space 31 within a field of vision of the user U10, into regions, each of which shows each real object. Thus, it is possible to recognize the type and position of each real object in the real space 31.

Figure 17:
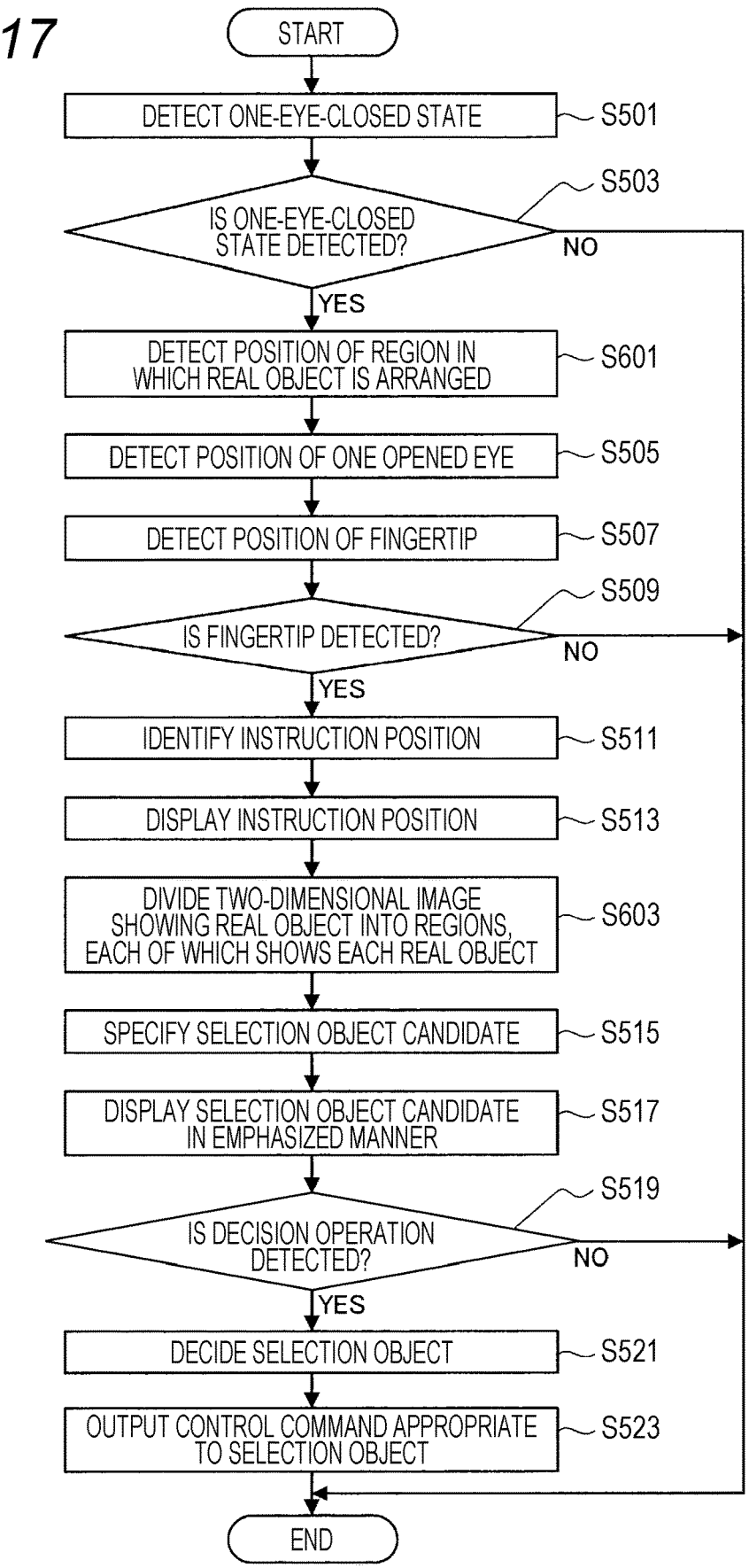
FIG. 17 is a flowchart illustrating an example of a flow of processing performed by an information processing apparatus according to the second variation.

FIG. 17 is a flowchart illustrating an example of a flow of processing performed by the information processing apparatus 300 according to the second variation. For example, the processing flow illustrated in FIG. 17 is always repeated.

The processing flow illustrated in FIG. 17, as compared with the aforementioned processing flow illustrated in FIG. 5, further executes processing of detecting the position of the region in which a real object is arranged (step S601) and processing of dividing a two-dimensional image showing a real object (step S603).

The processing of detecting the position of the region in which a real object is arranged (step S601) is executed before step S505, for example, in a case where YES is determined in step S503.

In step S601, the detection unit 320 detects the position of the region of the real space 31 in which a real object is arranged on the basis of the depth image acquired by the real space camera 90.

The processing of dividing a two-dimensional image showing a real object (step S603) is executed, for example, following step S513 before step S515.

In step S603, the division unit 331 divides a two-dimensional image acquired by the real space camera 90 and showing a real object present in the real space 31 within a field of vision of the user U10, into regions, each of which shows each real object.

The division unit 331 uses, for example, a well-known method called Semantic Segmentation that divides an image with respect to each region showing each object by means of convolutional neural network to divide a two-dimensional image acquired by the real space camera 90 with respect to each region showing each real object. Thus, the recognition of the type and position of each real object in the real space 31 is specifically achieved.

Figure 18:
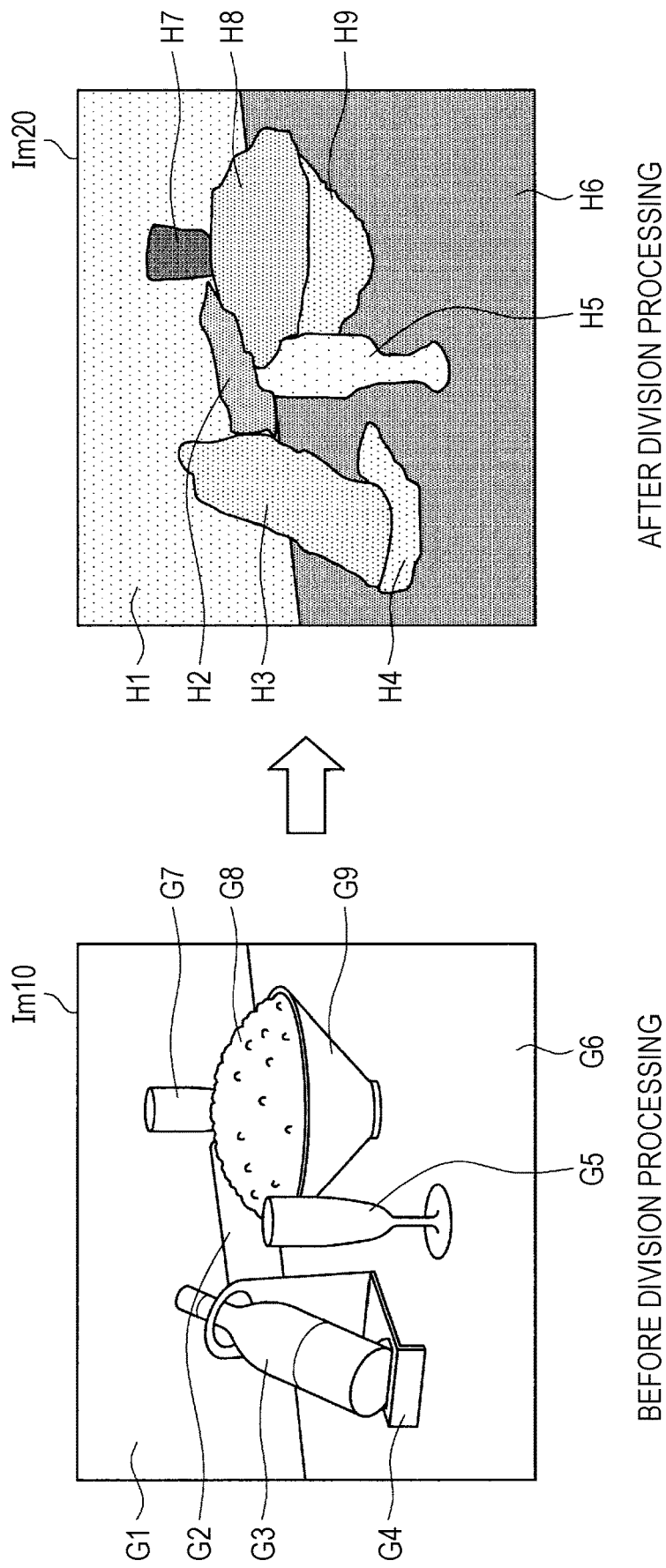
FIG. 18 is an explanatory view illustrating an example of a status before and after division processing for a two-dimensional image showing a real object.

FIG. 18 is an explanatory view illustrating an example of a status before and after the processing of dividing a two-dimensional image showing a real object. FIG. 18 illustrates a status in which the real objects G1 to G9 are shown on image Im10 before the division processing, which is acquired by the real space camera 90. In this case, the division unit 331 divides the image Im10 into regions, each of which shows each of the real objects G1 to G9. Thus, image Im20 after the division processing illustrated, for example, in FIG. 18 is obtained. In the image Im20, regions H1 to H9 correspond to regions showing each of the real objects G3 to G9. Note that, the display control unit 134 may display the image Im20 after the division processing in the real space 31 in a superimposing manner. Thus, the user U10 more easily distinguishes each of the real objects G1 to G9.

Here, the real objects G1 to G9 present in the real space 31 within a field of vision of the user U10 correspond to an object that can be selected by the user U10. Thus, the division unit 331 divides an image showing an object that can be selected by the user U10 into regions, each of which shows each object before a selection object candidate is specified.

In the above, the processing of detecting the position of the region in which a real object is arranged and the processing of dividing a two-dimensional image showing a real object are described, but, with the display system 3, similar to the information processing apparatus 100 of the display system 1, for example, the information processing apparatus 300 can execute different processing.

For example, FIG. 15 illustrates intersection P31 between the straight line connecting the left, eye U1 corresponding to the one opened eye and the fingertip U5 and a region of the real space 31 in which a real object is arranged. In this case, the identifying unit 131 identifies, for example, the intersection P31 as an instruction position. Thus, the identifying unit 131 identifies, for example, the position on the straight line connecting the left eye U1 corresponding to the one opened eye and the fingertip U5 as an instruction position.

As described above, the position of the region of the real space 31 in which a real object is arranged can be detected by the detection unit 320 on the basis of the depth image acquired by the real space camera 90. Hence, the identifying unit 131 can calculate the position of the intersection P31 on the basis of the positions of the left, eye U1, the fingertip U5, and the region of the real space 31 in which a real object is arranged, which are detected by the detection unit 320.

Note that the identifying unit 131, similar to the display system 1, may identify the position on the extension of the fingertip U5 as an instruction position. Specifically, the identifying unit 131 may identify the intersection between the straight line connecting the fingertip U5 of the user U10 and a joint of the finger corresponding to the fingertip U5 and the region of the real space 31 in which a real object is arranged as an instruction position. Furthermore, the identifying unit 131, similar to the display system 1, may switch the instruction position identifying mode between the first identifying mode in which the position on the straight line connecting the one opened eye and the fingertip U5 is identified as an instruction position and the second identifying mode in which the position on the extension of the fingertip G5 is identified as an instruction position.

Figure 19:
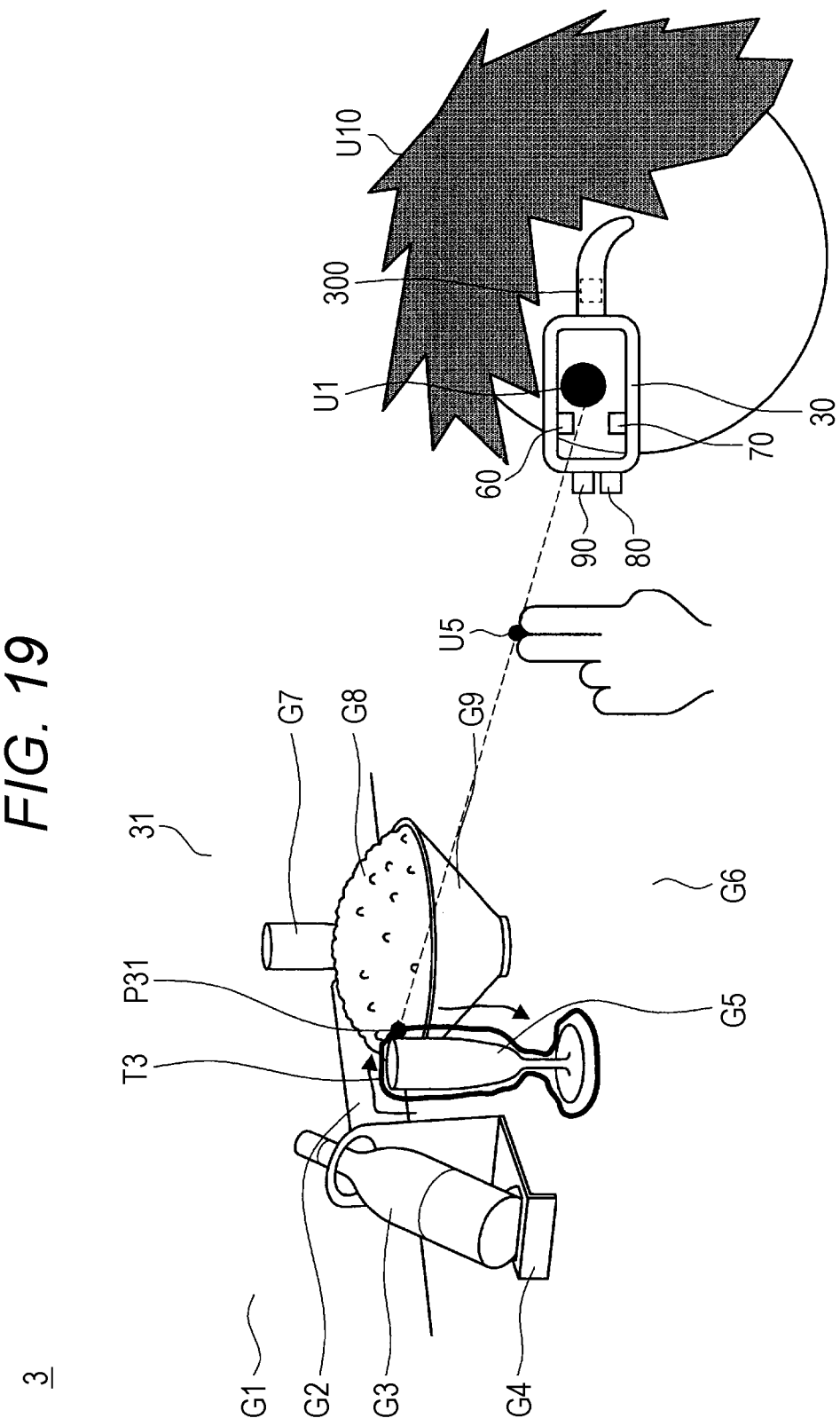
FIG. 19 is an explanatory view for explaining an example in which an object indicated by a trajectory of an instruction position is specified as a selection object candidate in a display system according to the second variation.

Furthermore, for example, FIG. 15 illustrates an example in which the real object G5 is positioned on the intersection P31 identified as a specification position. In this case, for example, the real object G5 positioned on the intersection P31 identified as a specification position is specified by the specifying unit 132 as a selection object candidate. Note that the specifying unit 132, similar to the display system 1, may specify, as a selection object candidate, an object indicated by a trajectory of an instruction position. For example, FIG. 19 illustrates a trajectory T3 of the intersection P31 in a case where the intersection P31 identified as an instruction position moves one round on the outer circumferential side of the real object G5 in response to the movement of the fingertip U5 of the user U10. In this case, the specifying unit 132 may specify, for example, the real object G5 surrounded by the trajectory T3 as a selection object candidate. Furthermore, the specifying unit 132, similar to the display system 1, may switch the selection object candidate specifying mode between the first specifying mode in which an object positioned at an instruction position is specified as a selection object candidate and the second specifying mode in which an object indicated by a trajectory of an instruction position is specified as a selection object candidate.

Here, in the second variation, a two-dimensional image showing the real objects G1 to G9 which are objects that can be selected by the user U20 is divided into regions, each of which shows each of the real objects G1 to G9 before a selection object candidate is specified. Thus, it is possible to recognize the type and position of each real object in the real space 31 before the processing of specifying a selection object candidate. Hence, even in a case where information indicating the type and position of an object that can be selected by the user U10 is not preliminarily stored in the storage element of the information processing apparatus 300, it is possible to properly specify a selection object candidate on the basis of an instruction position. Moreover, after the selection object candidate is decided to be a selection object, which is an object selected by the user U10, it is possible to properly output a control command appropriate to the decided selection object.

Note that, in the above, a description is given of an example in which a two-dimensional image acquired by the real space camera 90 is divided into regions, each of which shows each real object over the entire region with reference to FIG. 16, but the division unit 331 may divide only a partial region of the two-dimensional image acquired by the real space camera 90 into regions, each of which shows each real object. For example, the division unit 331 may divide only a region in the vicinity of a pixel corresponding to an instruction position of the two-dimensional image acquired by the real space camera 90 into regions, each of which shows each real object. Thus, it is possible to reduce calculation costs for the processing performed by the information processing apparatus 300.

Furthermore, in the above, a description is given of an example in which a real object present in the real space 31 is selected by means of an instruction using a part of the body of the user U10, but an object displayed in the real space 31 by the display apparatus 30 in a superimposed manner may be selected by an instruction using a part of the body of the user U10. In this case, for example, the intersection between the straight line connecting the one opened eye and the fingertip U5 or the straight line connecting the fingertip U5 and a joint of the finger corresponding to fingertip U5 and the region in which an object displayed in a superimposed manner in the real space 31 is arranged can be identified as an instruction position. Then, for example, the object positioned on the instruction position or the object indicated by a trajectory of an instruction position identified in the above manner is specified as a selection object candidate, and then decided to be a selection object, and a control command appropriate to the selection object can be output.

5. Conclusion

As described above, with the information processing apparatus 100 according to the present embodiment, an instruction position instructed by a part of the body of the user U10 is identified depending on a result of detection of the one-eye-closed state. Here, movement of bringing the eye opening/closing state to the one-eye-closed state is movement that is consciously performed by the user U10. Hence, it is possible to prevent manipulation of a device from being executed in a case where the user U10 unconsciously moves a part of the body without an intension of manipulating the device. Thus, it is possible to increase the manipulability for manipulation of a device by means of an instruction using a part of the body of the user U10.

Note that, in the above, a description is given of each display system including a plurality of cameras, but the number of cameras of each display system is not limited to such an example. Specifically, in each display system, some camera has the functions of the other cameras such that the other cameras may be omitted from the configuration of the display system. For example, with the display system 1, the functions of the eye position detection camera 70 and the finger position detection camera 80 may be achieved by a single camera. Furthermore, for example, with the display system 3, the functions of the finger position detection camera 80 and the real space camera 90 may be achieved by a single camera.

Furthermore, in the above, as an example in which the processing of dividing an image showing an object that can be selected by the user U10 into regions, each of which shows each object, the display system 3 using augmented reality is described. However, with the display system 1 or the display system 2, such image division processing may be performed. For example, with the display system 1, when a moving image of a television program is displayed on the screen 11 by the display apparatus 10, an object in the moving image can correspond to an object that can be selected by the user U10. In such a case, when processing of dividing each still image constituting the moving image into regions, each of which shows each object is performed, it is possible to recognize the type and position of each object of the moving image before the processing of specifying a selection object candidate. Furthermore, with the display system 2, similarly, an object in an image displayed in the virtual space 21 by the display apparatus 20 can also correspond to an object that can be selected by the user U10. Hence, when the processing of division into regions, each of which shows each object is performed with respect to the display system 2, it is possible to recognize the type and position of each object in the moving image before the processing of specifying a selection object candidate.

Furthermore, in the above, with the display system 3, a description is given of an example in which the processing of dividing a two-dimensional image acquired by the real space camera 90 into regions, each of which shows each real object, but the image division processing may not necessarily be performed with respect to the display system 3. Ever, in a case where the image division processing is not performed, the specifying unit 132 can specify, for example, a portion corresponding to the portion surrounded by the trajectory of an instruction position in the real space 31 of the two-dimensional image acquired by the real space camera 90 as a selection object candidate. In a case where such a selection object candidate is decided to be a selection object, as manipulation corresponding to the selection object, for example, manipulation of searching an object corresponding to the selection object from another image can be performed.

Note that a series of control processing by each apparatus described in the present specification may be achieved by any of software, hardware, and a combination of software and hardware. A program constituting software is preliminarily stored, for example, in a storage medium (non-transitory media) provided inside or outside each apparatus. Then, each program is read by a RAM when executed and executed, for example, by a processor, e.g., a CPU. A processor that executes each program may be singular or plural.

Specifically, a computer program for achieving the functions of the aforementioned information processing apparatus 100 or information processing apparatus 300 can be created and mounted on a PC or the like. The information processing apparatus 100 or the information processing apparatus 300 can correspond to a computer. Furthermore, a recording medium that stores such a computer program and can be read by a computer can also be provided. The recording medium is, for example, a magnetic disk, an optical disk, a magneto-optical disk, a flash memory, or the like. Furthermore, the above computer program may be distributed via a network, for example, without using a recording medium. Furthermore, the functions of the information processing apparatus 100 or the information processing apparatus 300 may be divided into a plurality of computers, and, in this case, the functions of the plurality of computers can be achieved by the aforementioned computer program.

Furthermore, the processing described in conjunction with the flowchart in the present specification may not necessarily be executed in the order indicated in the flowchart. Some processing steps may be executed in parallel. For example, in the flowcharts illustrated in FIGS. 5 and 6, the processing of step S507 and step S509 may be executed before step S501, step S503, or step S505. Furthermore, in the flowchart illustrated in FIG. 6, the processing of step S601 may be executed before step S501 or step S503, or after step S507 or step S509. Furthermore, in the flowchart illustrated in FIG. 6, the processing of step S603 may be executed before any processing of step S501 to step S513. Furthermore, an additional processing step may be adopted, and some processing step may be omitted.

The preferred embodiment of the present disclosure has been described above with reference to the accompanying drawings, while the technical scope of the present disclosure is not limited to the above examples. A person skilled in the art may find various alterations and modifications within the scope of the appended claims, and it should be understood that they will naturally come under the technical scope of the present disclosure.

Furthermore, the effects described in this specification are merely illustrative or exemplified effects, and are not limitative. That is, with or in the place of the above effects, the technology according to the present disclosure may achieve other effects that are clear to those skilled in the art from the description of this specification.

Note that the configuration below falls within the technical scope of the present disclosure.

(1)

An information processing apparatus including:

a detection unit that executes detection of a one-eye-closed state in which one eye of a user is opened and another eye is closed; and a control unit that identifies an instruction position instructed by a part of a body of the user depending on a result of detection of the one-eye-closed state by the detection unit.

(2)

The information processing apparatus according to (1), in which the control unit identifies a position on a straight line connecting the one eye and a fingertip of the user as the instruction position.

(3)

The information processing apparatus according to (1) or (2), in which the control unit identifies a position on an extension of the fingertip of the user as the instruction position.

(4)

The information processing apparatus according to any one of (1) to (3), in which the control unit switches a mode of identifying the instruction position between a first identifying mode in which the position on the straight line connecting the one eye and the fingertip of the user is identified as the instruction position and a second identifying mode in which the position on the extension of the fingertip is identified as the instruction position.

(5)

The information processing apparatus according to (4), in which the control unit executes switching of the mode of identifying the instruction position depending on a direction of a finger of the user used to instruct the instruction position.

(6)

The information processing apparatus according to (4) or (5), in which the control unit executes switching of the mode of identifying the instruction position depending on a distance between the one eye and the fingertip.

(7)

The information processing apparatus according to any one of (1) to (6), in which the instruction position is instructed at least by means of a fingertip of the user, and in a case where there is a plurality of instruction position candidates being candidates of the instruction position, the control unit identifies the instruction position from a plurality of the instruction position candidates on the basis of a distance between the one eye and the fingertip.

(8)

The information processing apparatus according to any one of (1) to (7), in which the control unit specifies a selection object candidate being a candidate of an object selected by the user, on the basis of the instruction position.

(9)

The information processing apparatus according to (8), in which the control unit specifies an object positioned at the instruction position as the selection object candidate.

(10)

The information processing apparatus according to (8) or (9), in which the control unit specifies an object indicated by a trajectory of the instruction position as the selection object candidate.

(11)

The information processing apparatus according to any one of (8) to (10), in which the control unit switches a mode of specifying the selection object candidate between a first specifying mode in which an object positioned at the instruction position is specified as the selection object candidate and a second specifying mode in which an object indicated by a trajectory of the instruction position is specified as the selection object candidate.

(12)

The information processing apparatus according to (11), in which the control unit executes switching of the mode of specifying the selection object candidate, depending on a shape of a part of the body of the user.

(13)

The information processing apparatus according to any one of (8) to (12), in which the control unit divides an image showing an object that can be selected by the user into regions, each of the regions showing each object before the selection object candidate is specified.

(14)

The information processing apparatus according to any one of (8) to (13), in which the control unit, in a case where a decision movement by a part of the body of the user is detected, decides the selection object candidate as a selection object, which is an object selected by the user.

(15)

The information processing apparatus according to any one of (8) to (14), in which the control unit causes a display apparatus to display the selection object candidate in an emphasized manner.

(16)

The information processing apparatus according to any one of (1) to (15), in which the control unit causes the display apparatus to display the instruction position.

(17)

The information processing apparatus according to any one of (1) to (16), in which in a case where the one-eye-closed state is detected, the control unit identifies the instruction position.

(18)

An information processing method including:

executing, by an information processing apparatus, detection of a one-eye-closed state in which one eye of a user is opened and another eye is closed; and identifying an instruction position instructed by a part of a body of the user depending on a result of detection of the one-eye-closed state by the information processing apparatus.

(19)

A computer-readable recording medium recording a program for causing a computer to function as:

a detection unit that executes detection of a one-eye-closed state in which one eye of a user is opened and another eye is closed; and a control unit that identifies an instruction position instructed by a part of a body of the user depending on a result of detection of the one-eye-closed state by the detection unit.

REFERENCE SIGNS LIST 1, 2, 3 Display system
10, 20, 30 Display apparatus
60 Eye opening/closing detection camera
70 Eye position detection camera
80 Finger position detection camera
90 Real space camera
100, 300 Information processing apparatus
110 Communication unit
120, 320 Detection unit
130, 330 Control unit
131 Identifying unit
132 Specifying unit
133 Decision unit
134 Display control unit
331 Division unit

The invention claimed is:

1. An information processing apparatus comprising:
a detection unit that executes detection of a one-eye-closed state in which one eye of a user is opened and another eye is closed; and
a control unit that identifies an instruction position instructed by a first part of a body of the user depending on a result of detection of the one-eye-closed state by the detection unit,
wherein the control unit switches a mode of identifying the instruction position between a first identifying mode in which a position on a straight line connecting the one eye and a fingertip of the user is identified as the instruction position and a second identifying mode in which a position on an extension of the fingertip is identified as the instruction position,
wherein the control unit executes switching of the mode of identifying the instruction position depending on a direction of the fingertip of the user used to instruct the instruction position, and
wherein the detection unit and the control unit are each implemented via at least one processor.

2. The information processing apparatus according to claim 1, wherein
the control unit further executes switching of the mode of identifying the instruction position depending on a distance between the one eye and the fingertip.

3. The information processing apparatus according to claim 1, wherein
in a case where there are a plurality of instruction position candidates being candidates of the instruction position, the control unit identifies the instruction position from the plurality of the instruction position candidates on a basis of a distance between the one eye and the fingertip.

4. The information processing apparatus according to claim 1, wherein
the control unit specifies a selection object candidate being a candidate of an object selected by the user, on a basis of the instruction position.

5. The information processing apparatus according to claim 4, wherein
the control unit specifies an object positioned at the instruction position as the selection object candidate.

6. The information processing apparatus according to claim 4, wherein
the control unit specifies an object indicated by a trajectory of the instruction position as the selection object candidate.

7. The information processing apparatus according to claim 4, wherein
the control unit switches a mode of specifying the selection object candidate between a first specifying mode in which an object positioned at the instruction position is specified as the selection object candidate and a second specifying mode in which an object indicated by a trajectory of the instruction position is specified as the selection object candidate.

8. The information processing apparatus according to claim 7, wherein
the control unit executes switching of the mode of specifying the selection object candidate, depending on a shape of a second part of the body of the user.

9. The information processing apparatus according to claim 4, wherein
the control unit divides an image showing an object that can be selected by the user into regions, each of the regions showing each object before the selection object candidate is specified.

10. The information processing apparatus according to claim 4, wherein
the control unit, in a case where a decision movement by a part of the body of the user is detected, decides the selection object candidate as a selection object, which is an object selected by the user.

11. The information processing apparatus according to claim 4, wherein
the control unit causes a display apparatus to display the selection object candidate in an emphasized manner.

12. The information processing apparatus according to claim 1, wherein
the control unit causes a display apparatus to display the instruction position.

13. The information processing apparatus according to claim 1, wherein
in a case where the one-eye-closed state is detected, the control unit identifies the instruction position.

14. An information processing method comprising:
executing, by an information processing apparatus, detection of a one-eye-closed state in which one eye of a user is opened and another eye is closed; and
identifying an instruction position instructed by a part of a body of the user depending on a result of detection of the one-eye-closed state by the information processing apparatus,
wherein a mode of identifying the instruction position is switched between a first identifying mode in which a position on a straight line connecting the one eye and a fingertip of the user is identified as the instruction position and a second identifying mode in which a position on an extension of the fingertip is identified as the instruction position, and
wherein the mode of identifying the instruction position is switched depending on a direction of the fingertip of the user used to instruct the instruction position.

15. A non-transitory computer-readable storage medium having embodied thereon a program, which when executed by a computer causes the computer to execute a method, the method comprising:
executing detection of a one-eye-closed state in which one eye of a user is opened and another eye is closed; and
identifying an instruction position instructed by a part of a body of the user depending on a result of detection of the one-eye-closed state by the detection unit,
wherein a mode of identifying the instruction position is switched between a first identifying mode in which a position on a straight line connecting the one eye and a fingertip of the user is identified as the instruction position and a second identifying mode in which a position on an extension of the fingertip is identified as the instruction position, and
wherein the mode of identifying the instruction position is switched depending on a direction of the fingertip of the user used to instruct the instruction position.

* * * * *